United States Patent
Morigami et al.

(10) Patent No.: US 10,743,023 B2
(45) Date of Patent: Aug. 11, 2020

(54) IMAGE PROCESSING APPARATUS AND IMAGE PROCESSING METHOD

(71) Applicant: SONY CORPORATION, Tokyo (JP)

(72) Inventors: Yoshitaka Morigami, Tokyo (JP); Takefumi Nagumo, Kanagawa (JP); Hironari Sakurai, Kanagawa (JP); Shuo Lu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/777,788

(22) PCT Filed: Aug. 26, 2016

(86) PCT No.: PCT/JP2016/075090
§ 371 (c)(1),
(2) Date: May 21, 2018

(87) PCT Pub. No.: WO2017/094298
PCT Pub. Date: Jun. 8, 2017

(65) Prior Publication Data
US 2018/0338156 A1 Nov. 22, 2018

(30) Foreign Application Priority Data
Dec. 4, 2015 (JP) .................. 2015-237278

(51) Int. Cl.
*H04N 19/57* (2014.01)
*H04N 19/436* (2014.01)
(Continued)

(52) U.S. Cl.
CPC ........... *H04N 19/57* (2014.11); *H04N 19/436* (2014.11); *H04N 19/52* (2014.11); *H04N 19/523* (2014.11); *H04N 19/55* (2014.11); *H04N 19/80* (2014.11)

(58) Field of Classification Search
CPC .................. H04N 19/57; H04N 19/436
(Continued)

(56) References Cited

U.S. PATENT DOCUMENTS

2010/0118961 A1 5/2010 Lee et al.
2010/0226440 A1* 9/2010 Miyoshi ................. H04N 19/00
375/240.16
(Continued)

FOREIGN PATENT DOCUMENTS

JP 2010-119084 5/2010
JP 2010-119084 A 5/2010
(Continued)

OTHER PUBLICATIONS

Schicrl, et al., "Dependent Slices", Joint Collaborative Team on Video Coding (JCT-VC) of ITU-T SG 16 WP 3 and ISO/IEC JTC 1/SC 29/WG II, JCTVC-I0229, 9th Meeting, Apr. 27-May 7, 2012, 8 pages.
(Continued)

*Primary Examiner* — Joseph G Ustaris
*Assistant Examiner* — Amir Shahnami
(74) *Attorney, Agent, or Firm* — Chip Law Group

(57) ABSTRACT

An image processing apparatus including an inter-prediction section that generates a set of reference pixels of fractional pixel positions from a reference image for motion compensation and searches an image to be encoded for a motion vector by using the set of generated reference pixels and an encoding section that encodes the image to be encoded on a basis of a result of searching for the motion vector by the inter-prediction section. The inter-prediction section includes a reference pixel at a fractional pixel position further inward than a first predetermined distance from a boundary of a partial region corresponding to a slice or a tile,
(Continued)

in the set of reference pixels that are used for searching the partial region for a motion vector.

12 Claims, 19 Drawing Sheets

(51) Int. Cl.
    *H04N 19/55*     (2014.01)
    *H04N 19/52*     (2014.01)
    *H04N 19/523*     (2014.01)
    *H04N 19/80*     (2014.01)

(58) Field of Classification Search
    USPC ........................................................ 375/240
    See application file for complete search history.

(56) References Cited

U.S. PATENT DOCUMENTS

| | | | | |
|---|---|---|---|---|
| 2012/0189057 | A1* | 7/2012 | Ugur | H04N 19/42 375/240.15 |
| 2013/0308027 | A1* | 11/2013 | Jenkin | H04N 5/347 348/302 |
| 2014/0133551 | A1* | 5/2014 | Alshina | H04N 19/61 375/240.03 |
| 2015/0103920 | A1* | 4/2015 | Rapaka | H04N 19/70 375/240.26 |
| 2015/0245059 | A1 | 8/2015 | Terada et al. | |
| 2016/0337661 | A1* | 11/2016 | Pang | H04N 19/105 |

FOREIGN PATENT DOCUMENTS

| | | | |
|---|---|---|---|
| JP | 2010-206664 A | 9/2010 | |
| JP | 2015-159531 A | 9/2015 | |
| JP | 2015-185979 A | 10/2015 | |
| JP | 2015159531 A5 * | 1/2016 | ........... H04N 19/105 |
| KR | 10-2010-0052773 A | 5/2010 | |

OTHER PUBLICATIONS

International Search Report and Written Opinion of PCT Application No. PCT/JP2016/075090, dated Nov. 8, 2016, 11 pages of translation and 09 pages ISRWO.
International Preliminary Report on Patentability of PCT Application No. PCT/JP2016/075090, dated Jun. 14, 2018, 11 pages of English Translation and 07 pages of IPRP.
"High Efficiency Video Coding", Series H: Audiovisual and Multimedia Systems, Infrastructure of Audiovisual Services—Coding of Moving Video, ITU-T Telecommunication Standardization Sector of ITU, Oct. 2014, 540 pages.
"Dependent Slices", Joint Collaborative Team on Video Coding (JCT-VC) of ITU-T SG16 WP3 and ISO/IEC JTC1/SC29/WG11, 9th Meeting, Geneva, CH, Apr. 27-May 7, 2012, 08 pages.
"High Efficiency Video Coding", Series H: Audiovisual and Multimedia Systems, Infrastructure of Audiovisual Services—Coding of Moving Video, Recommendation ITU-T H.265, Oct. 2014, 540 pages.
Schierl, et al., "Dependent Slices", Joint Collaborative Team on Video Coding (JCT-VC) of ITU-T SG 16 WP 3 and ISO/IEC JTC 1/SC 291WG 11, JCTVC-10229, Apr. 27-May 7, 2012, 08 pages.

* cited by examiner (M): MIRRORING    (C): APPLY RESTRICTION (M): MIRRORING    (C): APPLY RESTRICTION

IMAGE PROCESSING APPARATUS AND IMAGE PROCESSING METHOD

CROSS REFERENCE TO RELATED APPLICATIONS

This application is a U.S. National Phase of International Patent Application No. PCT/JP2016/075090 filed on Aug. 26, 2016, which claims priority benefit of Japanese Patent Application No. JP 2015-237278 filed in the Japan Patent Office on Dec. 4, 2015. Each of the above-referenced applications is hereby incorporated herein by reference in its entirety.

TECHNICAL FIELD

The present disclosure relates to an image processing apparatus, an image processing method, and a program.

BACKGROUND ART

In many video compression techniques, prediction encoding that is accompanied by motion compensation, that is, inter-prediction (also referred to as inter-frame prediction), has been used. The motion compensation is a technique that includes searching for motion of an object by an encoder, encoding and decoding of a motion vector, and generation of a predicted image based on a motion vector by a decoder. As precision of motion search by the encoder increases, a prediction error decreases, and a higher compression rate can be obtained. The precision of the motion search is restricted by resolution of the motion vector, and the resolution of the motion vector depends on pixel precision of a reference pixel. In a video encoding scheme H.264/AVC, which is a video encoding scheme in the related art, for example, a set of reference pixels with ¼ pixel precision for motion search is generated by using a combination of a 6-tap interpolation filter and linear interpolation. In H.265/HEVC, which is a new video encoding scheme succeeding H.264/AVC, a set of reference pixels with ¼ pixel precision is generated by using an interpolation filter of a maximum of eight taps (see Non-Patent Literature 1).

H.265/HEVC has also specified a method that is called tile division in addition to slice division that has also been employed in H.264/AVC for efficiently compressing a high-resolution video, such as a 4K or 8K video. It becomes easy to encode a video with high resolution or at a high frame rate in real time by processing a certain region (a slice or a tile) and another region in one picture in parallel by separate chips in a multiple-chip processor configuration, for example.

CITATION LIST

Non-Patent Literature

Non-Patent Literature 1: ITU-T, "H.265: High efficiency video coding," Recommendation ITU-T H.265, October, 2014

DISCLOSURE OF INVENTION

Technical Problem

However, in a case in which a certain partial region and an adjacent region are encoded by separate chips, filter taps of an interpolation filter for generating a reference pixel with fractional pixel precision also affect the adjacent region at a peripheral edge part of the partial region. Since memory resources are limited, the memory resources can be excessively consumed if the individual chips have to also maintain a large number of pixel values outside a target region in the memory. In addition, if opportunities to refer to pixel values outside the target region increase, a processing delay can increase as a result of inter-chip communication being frequently performed.

Therefore, it is desirable that a motion compensation method that is more appropriate for parallel processing by multiple chips be realized.

Solution to Problem

According to the present disclosure, there is provided an image processing apparatus including: an inter-prediction section that generates a set of reference pixels of fractional pixel positions from a reference image for motion compensation and searches an image to be encoded for a motion vector by using the set of generated reference pixels; and an encoding section that encodes the image to be encoded on a basis of a result of searching for the motion vector by the inter-prediction section. The inter-prediction section includes a reference pixel at a fractional pixel position further inward than a first predetermined distance from a boundary of a partial region corresponding to a slice or a tile, in the set of reference pixels that are used for searching the partial region for a motion vector.

In addition, according to the present disclosure, there is provided an image processing method including: generating a set of reference pixels of fractional pixel positions from a reference image for motion compensation; searching an image to be encoded for a motion vector by using the set of generated reference pixels; and encoding the image to be encoded on a basis of a result of searching for the motion vector. A reference pixel at a fractional pixel position further inward than a first predetermined distance from a boundary of a partial region corresponding to a slice or a tile is included in the set of reference pixels that are used for searching the partial region for a motion vector.

In addition, according to the present disclosure, there is provided a program that causes a computer to function as: an inter-prediction section that generates a set of reference pixels of fractional pixel positions from a reference image for motion compensation and searches an image to be encoded for a motion vector by using the set of generated reference pixels; and an encoding section that encodes the image to be encoded on a basis of a result of searching for the motion vector by the inter-prediction section. The inter-prediction section includes a reference pixel at a fractional pixel position further inward than a first predetermined distance from a boundary of a partial region corresponding to a slice or a tile, in the set of reference pixels that are used for searching the partial region for a motion vector.

Advantageous Effects of Invention

According to the technique of the present disclosure, it is possible to realize a motion compensation method that is more suitable for parallel processing of multiple chips.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
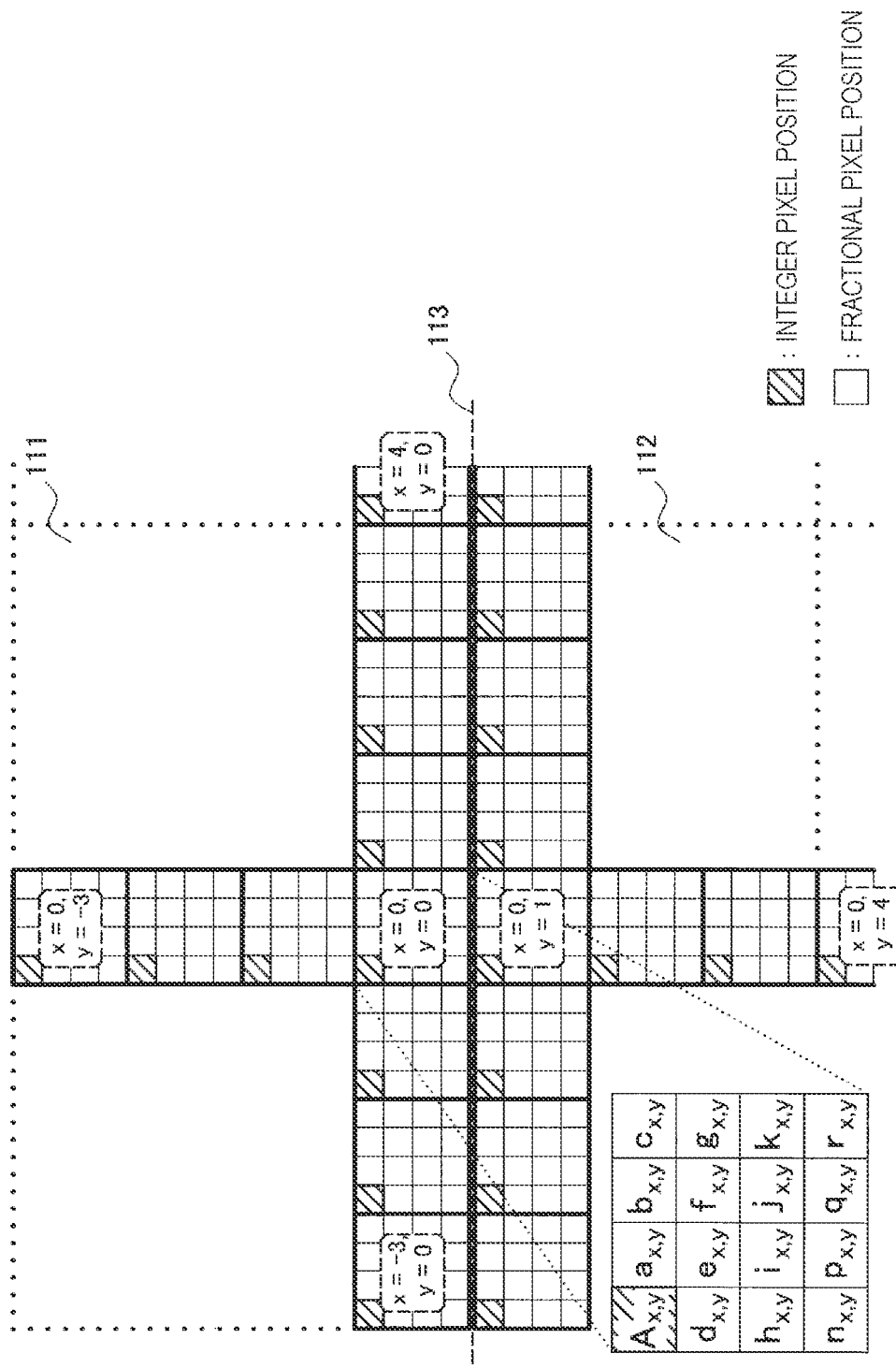
FIG. 1 is an explanatory diagram for explaining an interpolation filter for a luminance signal in H.265/HEVC.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be given in the following order.

1. Description of related techniques
2. Principles of technique according to the present disclosure
2-1. Restriction in searching on integer pixel positions
2-2. Restriction in searching on fractional pixel positions
2-3. Restriction in searching on merge candidates
2-4. Modification examples
3. Configuration of encoder
3-1. Overall configuration
3-2. Configuration of inter-prediction section
4. Flow of processing at time of encoding
5. Configuration of decoder
6. Application examples
7. Conclusion

1. DESCRIPTION OF RELATED TECHNIQUES

As described above, prediction encoding that is accompanied by motion compensation, that is, inter-prediction (also referred to as inter-frame prediction), has been utilized in many video compression techniques. For the motion compensation, an encoder searches for motion of an object and decides an optimal mode in terms of efficiency in encoding on the basis of a result of the searching. The encoder encodes information related to inter-prediction, such as motion vector information, prediction block information, and reference image information, and generates an encoded bit stream in a case in which an inter-prediction mode is selected. A decoder generates a predicted image from a reference image by using a motion vector in accordance with the information related to the inter-prediction decoded from the bit stream, adds a predicted error to the generated predicted image, and reconstructs an image. As the predicted error in the inter-prediction is smaller, that is, as precision of motion search by the encoder is higher, a higher compression rate can be achieved.

Precision of the motion search by the encoder is typically restricted by resolution of the motion vector, and the resolution of the motion vector depends on pixel precision of the reference pixels, that is, roughness of pixel positions. In H.264/AVC, for example, a set of reference pixels with ¼-pixel precision for motion search is generated by using a combination of a 6-tap interpolation filter and linear interpolation. In H.265/HEVC, a set of reference pixels with ¼-pixel precision (⅛-pixel precision for a color difference signal) is generated by using an interpolation filter of a maximum of eight taps.

FIG. 1 is an explanatory diagram for explaining an interpolation filter for a luminance signal in H.265/HEVC. Referring to FIG. 1, pixels at pixel positions with integer precision (hereinafter referred to as integer pixel positions) and pixels at pixel positions with fractional precision (hereinafter referred to as fractional pixel positions) are represented by small hatched squares and small non-hatched squares, respectively. A reference pixel at an integer pixel position is described as A (x, y) by using coordinates (x, y). Different lowercase letters a to r will be applied to the respective reference pixels at fractional pixel positions in accordance with relative positional relationships with integer pixel positions. For example, pixel values of reference pixels $a_{x,y}$, $b_{x,y}$, $c_{x,y}$, $d_{x,y}$, $h_{x,y}$, and $n_{x,y}$ are interpolated by an 8-tap or 7-tap filter operation described below by using the reference pixel values at the integer pixel positions.

$$a_{0,0} = (-A_{-3,0} + 4*A_{-2,0} - 10*A_{-1,0} + 58*A_{0,0} + 17*A_{1,0} - 5*A_{2,0} + A_{3,0}) >> \text{shift1}$$

$$b_{0,0} = (-A_{-3,0} + 4*A_{-2,0} - 11*A_{-1,0} + 40*A_{0,0} + 40*A_{1,0} - 11*A_{2,0} + 4*A_{3,0} - A_{4,0}) >> \text{shift1}$$

$$c_{0,0}=(A_{-2,0}-5*A_{-1,0}+17*A_{0,0}+58*A_{1,0}-10*A_{2,0}+4*A_{3,0}-A_{4,0})\gg\text{shift1}$$

$$d_{0,0}=(-A_{0,-3}+4*A_{0,-2}-10*A_{0,-1}+58*A_{0,0}+17*A_{0,1}-5*A_{0,2}+A_{0,3})\gg\text{shift1}$$

$$h_{0,0}=(-A_{0,-3}+4*A_{0,-2}-11*A_{0,-1}+40*A_{0,0}+40*A_{0,1}-11*A_{0,2}+4*A_{0,3}-A_{0,4})\gg\text{shift1}$$

$$n_{0,0}=(A_{0,-2}-5*A_{0,-1}+17*A_{0,0}+58*A_{0,1}-10*A_{0,2}+4*A_{0,3}-A_{0,4})\gg\text{shift1}$$

[Math. 1]

Further, pixel values of reference pixels $e_{x,y}$, $i_{x,y}$, $p_{x,y}$, $f_{x,y}$, $j_{x,y}$, $q_{x,y}$, $g_{x,y}$, $k_{x,y}$, and $r_{x,y}$ are interpolated by an 8-tap or 7-tap filter operation described below by using the reference pixel values at the integer pixel positions and calculated reference pixel values at fractional pixel positions.

$$e_{0,0}=(-a_{0,-3}+4*a_{0,-2}-10*a_{0,-1}+58*a_{0,0}+17*a_{0,1}-5*a_{0,2}+a_{0,3})\gg\text{shift2}$$

$$i_{0,0}=(-a_{0,-3}+4*a_{0,-2}-11*a_{0,-1}+40*a_{0,0}+40*a_{0,1}-11*a_{0,2}+4*a_{0,3}-a_{0,4})\gg\text{shift2}$$

$$p_{0,0}=(a_{0,-2}-5*a_{0,-1}+17*a_{0,0}+58*a_{0,1}-10*a_{0,2}+4*a_{0,3}-a_{0,4})\gg\text{shift2}$$

$$f_{0,0}=(-b_{0,-3}+4*b_{0,-2}-10*b_{0,-1}+58*b_{0,0}+17*b_{0,1}-5*b_{0,2}+b_{0,3})\gg\text{shift2}$$

$$j_{0,0}=(-b_{0,-3}+4*b_{0,-2}-11*b_{0,-1}+40*b_{0,0}+40*b_{0,1}-11*b_{0,2}+4*b_{0,3}-b_{0,4})\gg\text{shift2}$$

$$q_{0,0}=(b_{0,-2}-5*b_{0,-1}+17*b_{0,0}+58*b_{0,1}-10*b_{0,2}+4*b_{0,3}-b_{0,4})\gg\text{shift2}$$

$$g_{0,0}=(-c_{0,-3}+4*c_{0,-2}-10*c_{0,-1}+58*c_{0,0}+17*c_{0,1}-5*c_{0,2}+c_{0,3})\gg\text{shift2}$$

$$k_{0,0}=(-c_{0,-3}+4*c_{0,-2}-11*c_{0,-1}40*c_{0,0}+\mathbf{40}*c_{0,1}-11*c_{0,2}+4*c_{0,3}-c_{0,4})\gg\text{shift2}$$

$$r_{0,0}=(c_{0,-2}-5*c_{0,-1}+17*c_{0,0}+58*c_{0,1}-10*c_{0,2}+4*c_{0,3}-c_{0,4})\gg\text{shift2}$$

[Math. 2]

Incidentally, it is possible to execute encoding processing and decoding processing for each slice by dividing one picture into a plurality of slices for efficiently compressing a video in H.264/AVC and H.265/HEVC. H.265/HEVC has also specified a method called tile division that has further enhanced compatibility with parallel processing in addition to the slice division. It becomes easy to encode a video with high resolution or at a high frame rate in real time by causing separate chips (for example, cores) in a multiple-chip processor configuration to process each of a plurality of partial regions corresponding to such slices or tiles in parallel. Note that the multiple chips described in the specification are processing devices in various forms, such as multiple processors and multiple cores, that have a plurality of processing circuits that can operate in parallel.

Here, it is assumed that a reference pixel A (0, 0) belongs to a partial region 111, a reference pixel A (0, 1) belongs to a partial region 112, and there is a region boundary 113 between these two reference pixels. If it is attempted to generate a reference pixel at a fractional pixel position in the vicinity of the reference pixel A (0, 0) by an interpolation filter in this case, filter taps of the interpolation filter also affect the partial region 112 outside the partial region 111. In a case in which the partial region 111 and the partial region 112 are processed by separate chips in a multiple-tip processor configuration, the chip for processing the partial region 111 has to calculate and store a reference pixel in the partial region 112, and the chip for processing the partial region 112 has to calculate and store a reference pixel in the partial region 111 in a similar manner. However, memory resources are limited, and it is not desirable to excessively consume memory resources. In addition, if opportunities for the individual chips to refer to pixel values outside the regions that have been assigned to the chips themselves increase, there is a possibility of a processing delay increasing as a result of inter-chip communication being frequently performed.

In H.265/HEVC, slices are roughly classified into independent slices and dependent slices. The independent slices are slices that can be decoded only on the basis of information of the slices themselves. Meanwhile, the dependent slices are slices that require information of other slices for decoding. The aforementioned reference outside the region by the interpolation filter for motion compensation typically takes place in the dependent slices.

Figure 2A:
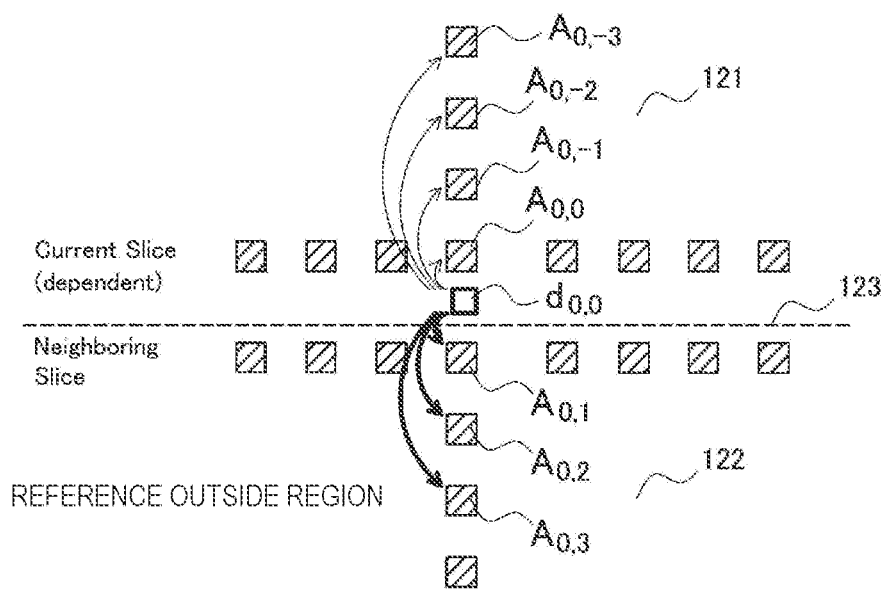
FIG. 2A is an explanatory diagram for explaining handling of filter taps of the interpolation filter at a peripheral edge part of a dependent slice.

FIG. 2A is an explanatory diagram for explaining handling of filter taps of the interpolation filter at a peripheral edge part of a dependent slice. Referring to FIG. 2A, a slice 121 and a slice 122 that are adjacent to each other with a region boundary 123 interposed therebetween are illustrated, and the slice 121 is a dependent slice. A reference pixel $A_{0,0}$ belongs to the slice 121 while a reference pixel $A_{0,1}$ belongs to the slice 122. When a reference pixel value of a reference pixel $d_{0,0}$ at a fractional pixel position in the vicinity of the reference pixel $A_{0,0}$ is calculated by the aforementioned interpolation filter, the filter taps of the interpolation filter include reference pixels $A_{0,1}$, $A_{0,2}$ and $A_{0,3}$ that belong to the slice 122. Such reference relationships correspond to the reference outside the region.

Figure 2B:
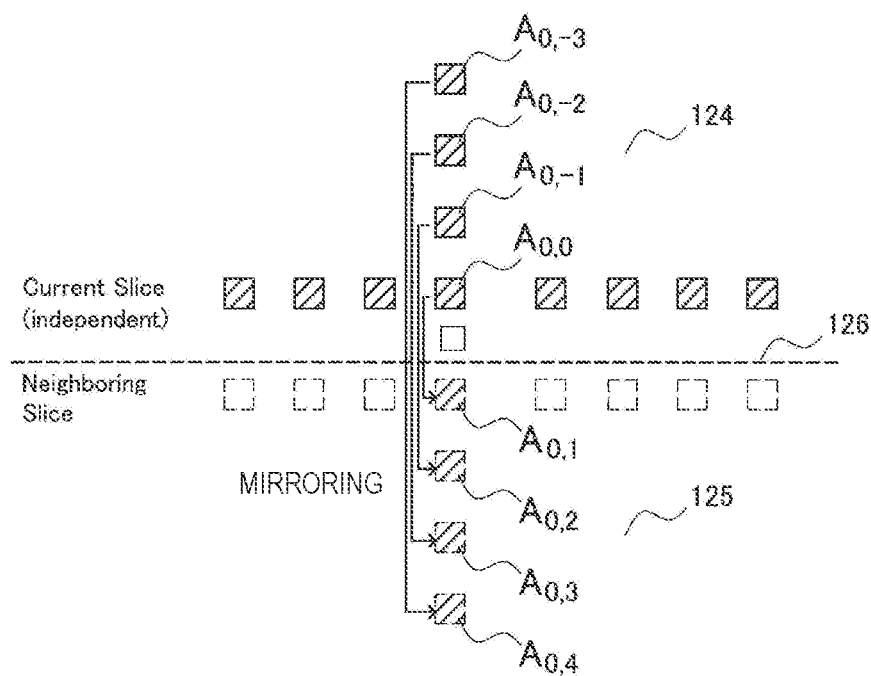
FIG. 2B is an explanatory diagram for explaining handling of filter taps of the interpolation filter at a peripheral edge part of an independent slice.

Since reference pixels outside a region are generated by mirroring pixel values in the region (copying pixel values at corresponding pixel positions) in the independent slice, substantially no reference outside the region occurs. Handling of reference pixels in a tile is similar to that in the independent slice. FIG. 2B is an explanatory diagram for explaining handling of filter taps of the interpolation filter at a peripheral edge part of an independent slice. Referring to FIG. 2B, a slice 124 and a slice 125 that are adjacent to each other with a region boundary 126 interposed therebetween are illustrated. A reference pixel $A_{0,0}$ belongs to the slice 124 while a reference pixel $A_{0,1}$ belongs to the slice 125. In this example the slice 124 is an independent slice. Therefore, pixel values of the reference pixels $A_{0,0}$, $A_{0,-1}$, $A_{0,-2}$, and $A_{0,-3}$ are copied as filter tap values at integer pixel positions $A_{0,1}$, $A_{0,2}$, $A_{0,3}$, and $A_{0,4}$ for calculation of the interpolation filter in the vicinity of the reference pixel $A_{0,0}$, for example.

Figure 2C:
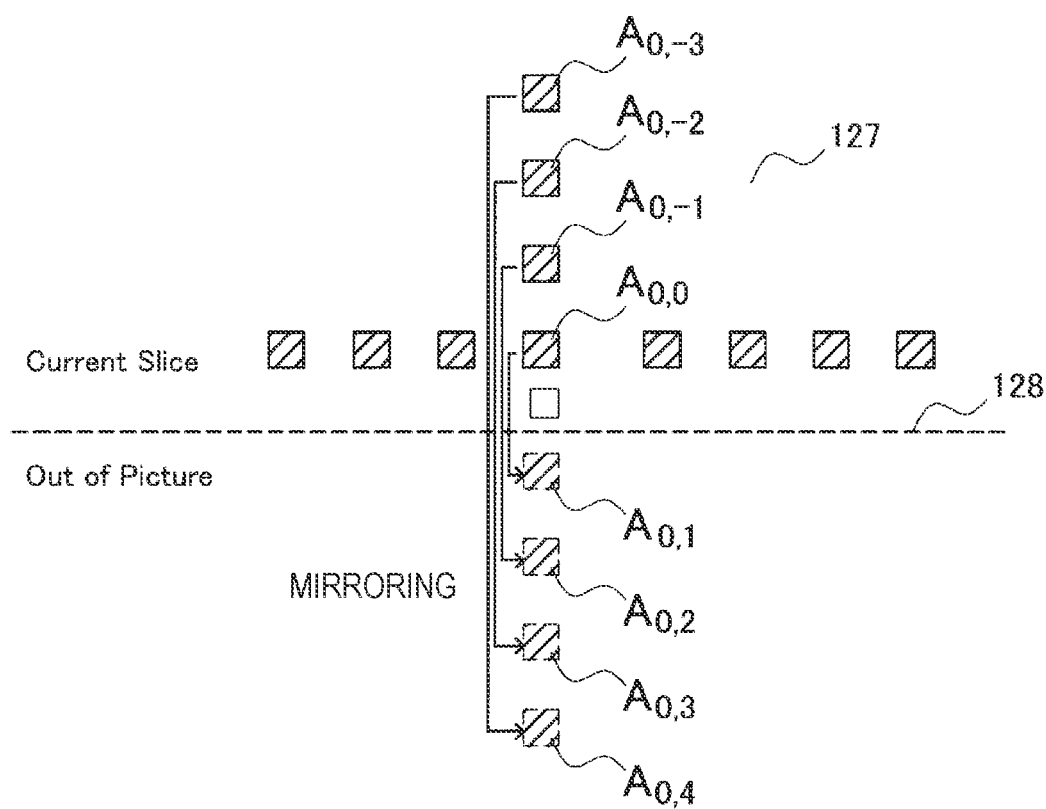
FIG. 2C is an explanatory diagram for explaining handling of filter taps of the interpolation filter at a picture end.

Handling of the filter taps of the interpolation filter at a picture end is similar to the handling of those in the independent slice and the tile. FIG. 2C is an explanatory diagram for explaining handling of filter taps of the interpolation filter at a picture end. Referring to FIG. 2C, a slice 127 that is adjacent to a picture end 128 is illustrated. A reference pixel $A_{0,0}$ is located at a lower end of the slice 127, and a reference pixel $A_{0,1}$ is missed outside the picture end 128. In this case, pixel values of the reference pixels $A_{0,0}$, $A_{0,-1}$, $A_{0,-2}$, and $A_{0,-3}$ are copied as filter tap values at integer pixel positions $A_{0,1}$, $A_{0,2}$, $A_{0,3}$, and $A_{0,4}$, respectively, for calculation of the interpolation filter in the vicinity of the reference pixel $A_{0,0}$ regardless of which of a dependent slice or an independent slice the slice 127 is.

In this manner, whether or not substantial reference outside the region occurs depends on a type of region or boundary to be processed. However, implementation of the encoder becomes complicated if it is necessary for the individual chips to determine such types and to branch processing. It is desirable to decide whether or not to determine which of an independent slice, a dependent slice, and a tile the region to be processed is in consideration of trade-off between the required performance of the encoder and the implementation cost. The idea of the technique according to the present disclosure, which will be described below, may be applied not only to the region boundary of a dependent slice (rather than the picture end) but also commonly to all the boundary regardless of the type of target region or boundary. Although FIGS. 1, 2A, 2B and 2C illustrate the examples of the boundaries below the target regions, the idea of the technique according to the present disclosure may be applied to an upper boundary of a target region or a left or right boundary of the target region (depending on a configuration of the interpolation filter).

2. PRINCIPLES OF TECHNIQUE ACCORDING TO THE PRESENT DISCLOSURE

According to an embodiment of the technique of the present disclosure, in order to avoid the reference outside the region of the interpolation filter for motion compensation described above, the following restrictions C1 and C2 are applied to a search range for motion compensation at a peripheral edge part of a partial region, in particular.

C1) Reference pixels at integer pixel positions further outward than a distance D1 from the boundary of the partial region are not referred to.

C2) Reference pixels at fractional pixel positions further outward than a distance D2 from the boundary of the partial region are not referred to.

Note that the distance D2 is assumed to be a distance in a filter tap direction of the interpolation filter that is used for generating the reference pixels at the fractional pixel positions. In a case in which a direction toward the inner side of the partial region is assumed to be positive, the distance D2 is greater than the distance D1, and a difference between the distance D2 and the distance D1 depends on the configuration of the interpolation filter and is mainly based on the tap length of the interpolation filter.

Further, in a case in which merge encoding of H.265/HEVC is supported by the encoder, the following restriction C3 is imposed on merge candidates that can be selected:

C3) Merge candidates of which motion vectors violate the restriction C1 or C2 in a case in which the merge candidates are selected in a certain prediction block cannot be selected (are excluded from a merge candidate list).

2-1. Restriction in Searching on Integer Pixel Positions

Figure 3:
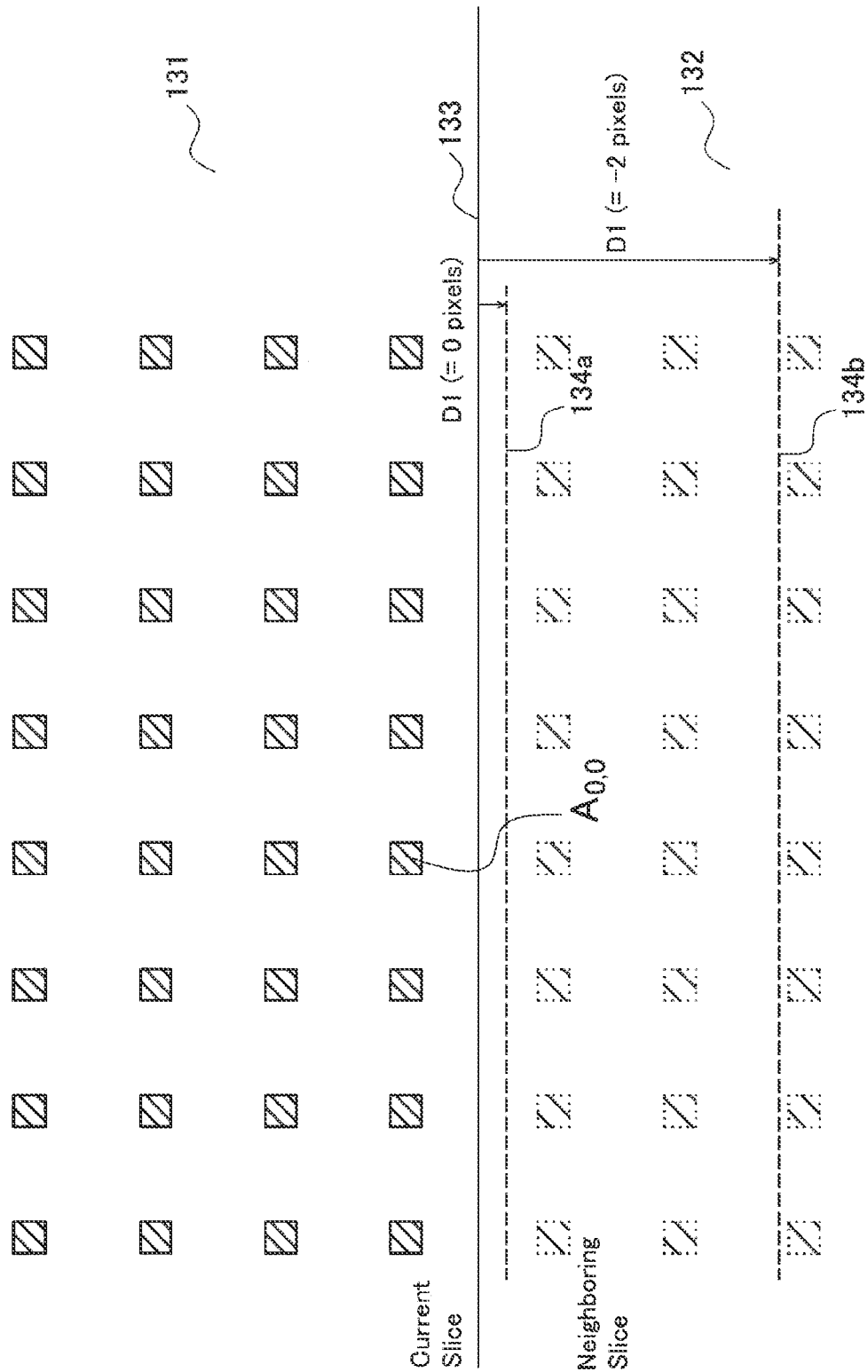
FIG. 3 is an explanatory diagram for explaining an example of restriction in searching on integer pixel positions.

Here, the aforementioned restriction C1 will be described. FIG. 3 is an explanatory diagram for explaining an example of restriction C1 in searching on integer pixel positions. Referring to FIG. 3, a region 131 that is a current slice and an adjacent region 132 that is adjacent to the region 131 are illustrated. A boundary 133 is a boundary below the region 131, and a reference pixel $A_{0,0}$ is adjacent to the boundary 133. In an embodiment, reference pixels at integer pixel positions further outward than the distance D1 from the boundary 133 are not included in a set of reference pixels that are used for searching a prediction block in the region 131 for motion vectors according to the restriction C1. In a case in which the distance D1 is equal to zero, this means that a search range of a motion vector in the region 131 is restricted to inside the region 131. In this case, it is only necessary for the chip that processes the region 131 to buffer reference pixel values at integer pixel positions that belong to the region 131 for motion search by using the memory resources of the chip (it is assumed that fractional pixel positions are not considered here), and the range of the buffering is represented by the dotted line 134a in the drawing. In a case in which the distance D2 is equal to 2 pixels on the negative side, for example, this means that the search range of the motion search in the region 131 is restricted to inside a range including two pixels outside the region 131. In this case, it is only necessary for the chip that processes the region 131 to buffer the reference pixel values at the integer pixel positions inside the range up to the two pixels outside the region 131 for the motion search, and the range is represented by the dotted line 134b in the drawing.

2-2. Restriction in Searching on Fractional Pixel Positions

Figure 4:
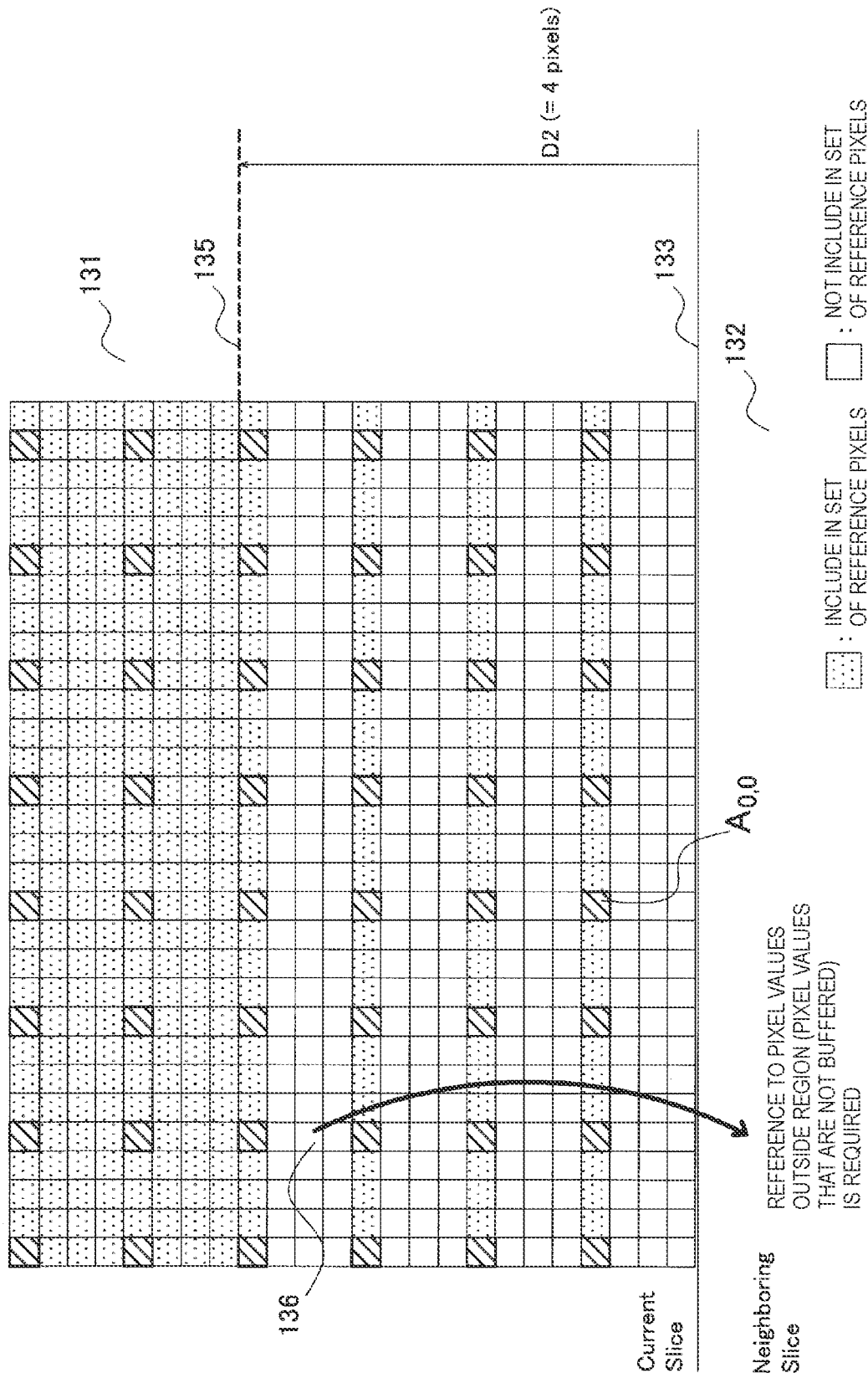
FIG. 4 is an explanatory diagram for explaining an example of restriction in searching on fractional pixel positions.

Next, the aforementioned restriction C2 will be described. FIG. 4 is an explanatory diagram for explaining an example of the restriction C2 in searching on the fractional pixel positions. Referring to FIG. 4, the region 131 that is a current slice, the adjacent region 132, and the boundary 133 are illustrated again. In an embodiment, according to the restriction C2, reference pixels at the fractional pixel positions outside the distance D2 from the boundary 133 are not included in the set of reference pixels that are used for searching a prediction block in the region 131 for a motion vector. The distance D2 is a distance in the filter tap direction of the interpolation filter that is used for generating the reference pixels at the fractional pixel positions. The filter tap direction is a horizontal direction for the reference pixels $a_{x,y}$, $b_{x,y}$, and $c_{x,y}$, and is a vertical direction for reference pixels $d_{x,y}$, $h_{x,y}$, $n_{x,y}$, $e_{x,y}$, $i_{x,y}$, $p_{x,y}$, $f_{x,y}$, $j_{x,y}$, $q_{x,y}$, $g_{x,y}$, $k_{x,y}$, and $r_{x,y}$, illustrated in FIG. 1. In a case in which the maximum length of the filter tap of the interpolation filter is $N_{IF}$ taps, the distance D2 is set as in the following equation.

[Math. 3]

$$D2 = D1 + \text{Ceil}(N_{IF}/2) \qquad (1)$$

Here, Ceil(X) is a function that represents rounding-up of an argument X. Equation (1) means that the distance D2 is based on the outermost integer pixel position (the position represented by D1) to be included in a set of reference pixels and the tap length of the interpolation. FIG. 4 illustrates a case in which the distance D1 is equal to zero, the maximum length $N_{IF}$ of the filter tap is equal to eight taps, and the distance D2 is equal to four pixels (four pixels toward the inner side from the boundary 133). That is, the search range of the fractional pixel positions is reduced toward the inner side beyond the search range of the integer pixel position by a half of the maximum tap length of the interpolation filter. On the assumption that the maximum tap length of the interpolation filter is eight taps, it is possible to generate the reference pixels at all the fractional pixel positions to be included in a set of reference pixels by using only the reference pixels at the integer pixel positions inside the region 131 in the example in FIG. 4. The reference pixels (for example, the pixel 136) at the fractional pixel positions at a peripheral edge part (within four pixels from the boundary) of the region 131 that cannot be generated without referring to the reference pixels in the adjacent region 132 are excluded from the set of reference pixels for the motion search. Reference outside the region is avoided in this manner.

Note that, in a case in which buffering of the reference pixel values at a part of integer pixel positions outside the region is also allowed as in the case of D1=−2 as illustrated in FIG. 3, a broader search range of the fractional pixel positions can be set. If D1=−4 and $N_{IF}$=8, for example, D2=0. In this case, by allowing an increase in the amount of consumption of memory resources, it is possible to include all the fractional pixel positions that belong to the partial region to be processed in the search range of the motion vector.

2-3. Restriction in Searching on Merge Candidates

Figure 5:
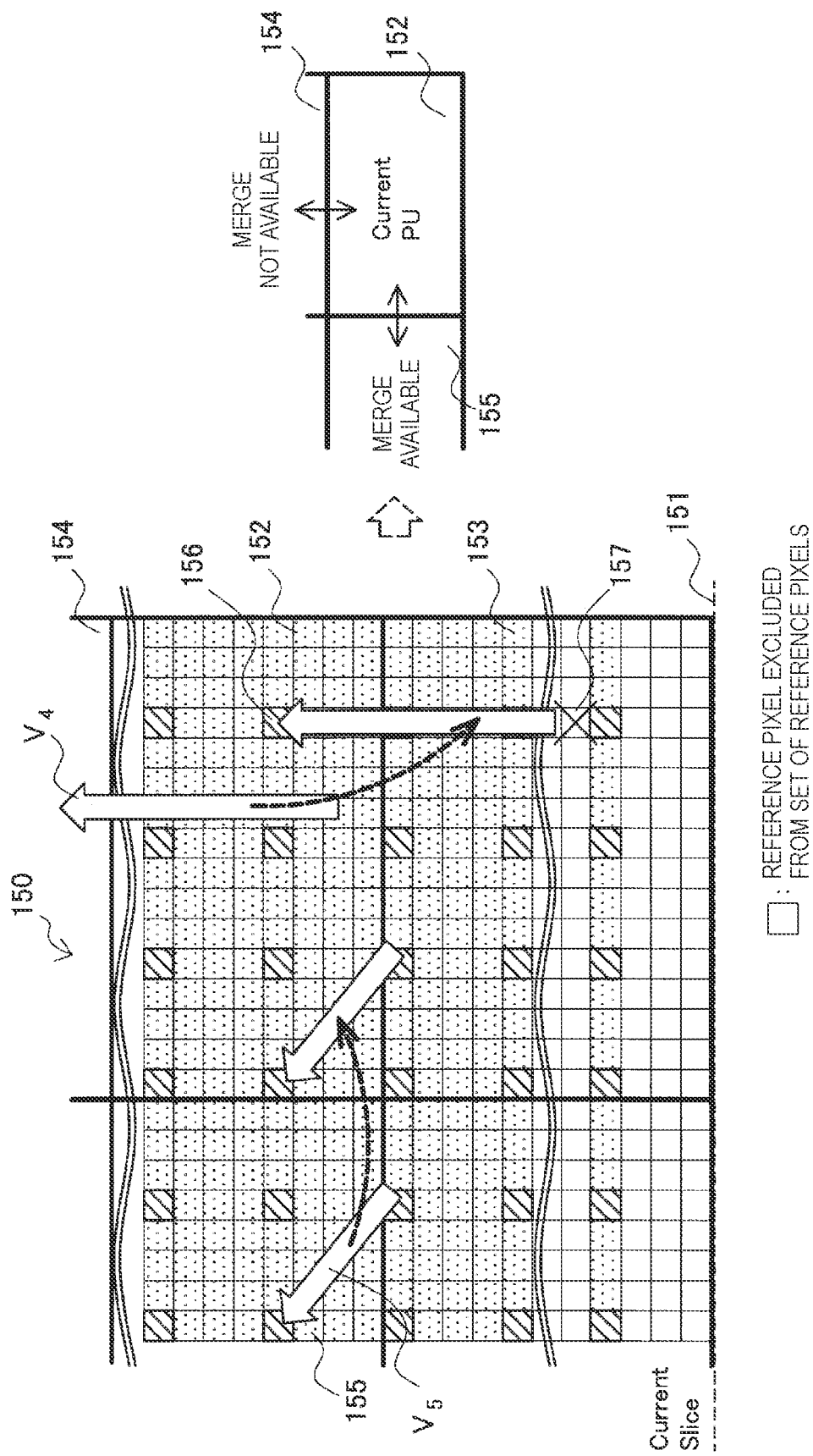
FIG. 5 is an explanatory diagram for explaining an example of restriction in searching on merge candidates.

Next, the aforementioned restriction C3 will be described. FIG. 5 is an explanatory diagram for explaining an example of restriction in searching on merge candidates. Referring to FIG. 5, a region 150 that is a current slice includes blocks 152, 153, 154, and 155. Here, the block 152 is a current block (that is, a prediction block to be processed). The block 153 is an adjacent block that is adjacent to the lower side of the current block 152 and is adjacent to the upper side of the region boundary 151. Although the adjacent block 153 is included in the region 150, fractional pixel positions in the vicinity of the boundary 151 in the adjacent block 153 are excluded from the set of reference pixels for the motion search in accordance with the aforementioned restriction C2. The blocks 154 and 155 are adjacent blocks that are adjacent to the upper side and the left side of the current block 152, respectively.

In a merge mode of H.265/HEVC, the merge candidate list can include a maximum of five merge candidates. Here, the merge candidate list for the current block 152 is assumed to include two merge candidates corresponding to the adjacent block 154 on the upper side and the adjacent block 155 on the left side for simple configuration. An optimal motion vector that is obtained as a result of searching the adjacent block 154 is a motion vector $V_4$. In a case in which the motion vector $V_4$ is applied to the current block 152, reference pixels in the vicinity of the boundary 151 in the adjacent block 153 are required for generating a predicted image of the current block 152. However, some necessary reference pixels (for example, the reference pixel 157 for a predicted pixel value of a pixel 156) are excluded from the set of reference pixels for the motion search in accordance with the aforementioned restriction C2. Therefore, the adjacent block 154 on the upper side is excluded from the merge candidate list for the current block 152. An optimal motion vector that is obtained as a result of searching the adjacent block 155 is a motion vector $V_5$. Reference pixels that are required for generating a predicted image of the current block 152 in a case in which the motion vector $V_5$ is applied to the current block 152 are not excluded from the set of reference pixels for the motion search. Therefore, the adjacent block 155 on the left side is not excluded from the merge candidate list of the current block 152 in this case. In a case in which the merge candidates are excluded from the merge candidate list, the merge candidate list may be refilled with other alternative merge candidates.

The chip that executes inter-prediction for a certain partial region is not required to hold the pixel values at a large number of pixel positions outside the partial region as the reference pixel values because the restriction described herein is imposed on the search range of the motion compensation. The frequency of inter-chip communication among a plurality of chips that process mutually adjacent regions in parallel is also reduced. An example of the configuration of the image encoding device for realizing such a mechanism will be described.

3. CONFIGURATION OF ENCODER 3-1. Overall Configuration

Figure 6:
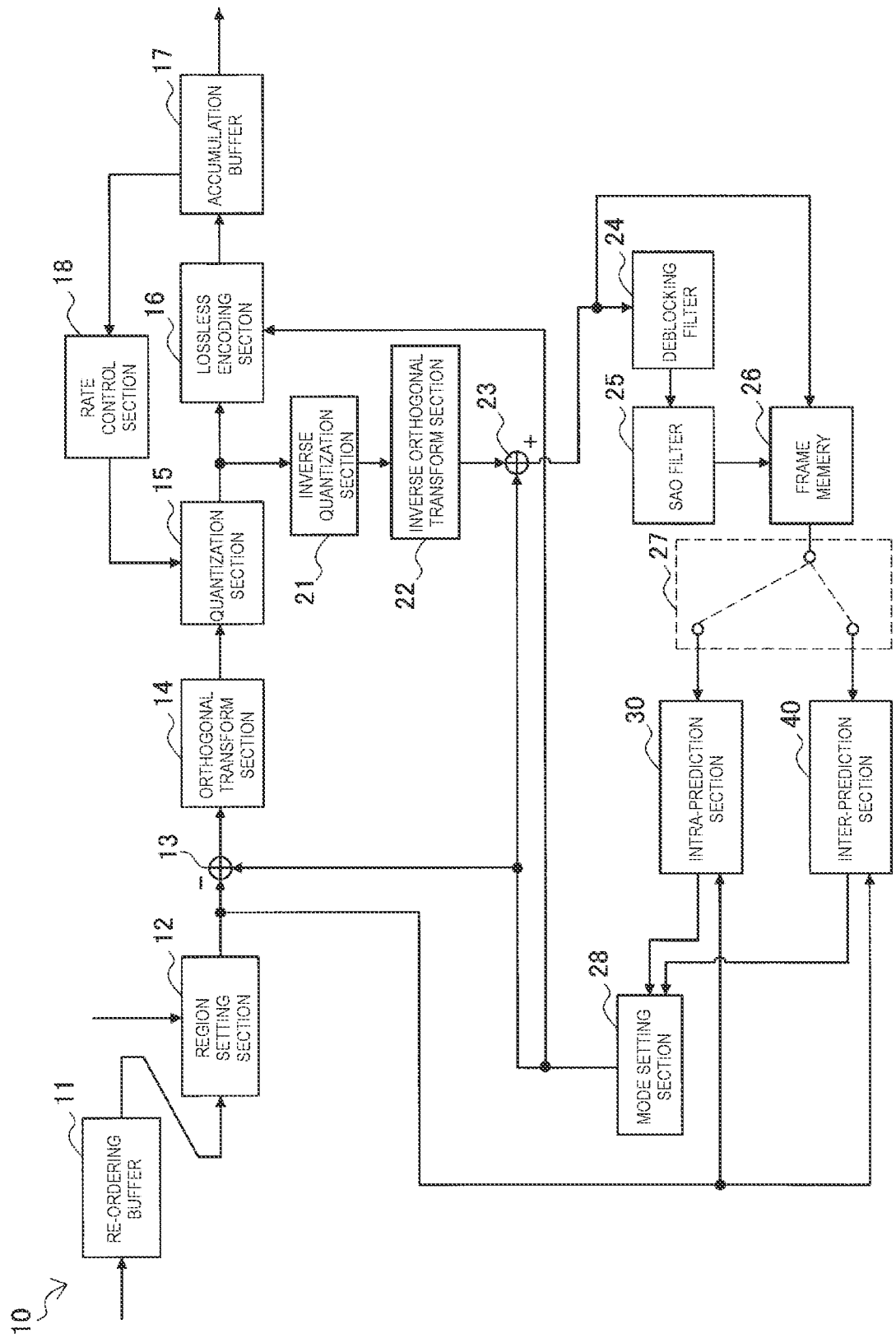
FIG. 6 is a block diagram illustrating an example of a configuration of an image encoding device.

FIG. 6 is a block diagram illustrating an example of a configuration of the image encoding device 10. With reference to FIG. 6, the image encoding device 10 has a re-ordering buffer 11, a region setting section 12, a subtraction section 13, an orthogonal transform section 14, a quantization section 15, a lossless encoding section 16, an accumulation buffer 17, a rate control section 18, an inverse quantization section 21, an inverse orthogonal transform section 22, an addition section 23, a deblocking filter 24, an SAO filter 25, a frame memory 26, a switch 27, a mode setting section 28, an intra-prediction section 30, and an inter-prediction section 40.

The re-ordering buffer 11 re-orders image data of a sequence of images constituting a video to be encoded in accordance with a Group of Pictures (GOP) structure associated with the encoding process. The re-ordering buffer 11 outputs the image data after re-ordering to the region setting section 12.

A region setting section 12 sets one or more regions in each image corresponding to a picture. The regions described herein correspond to slices or tiles. The region setting section 12 may set the regions on the basis of image analysis. In addition, the region setting section 12 may set the regions on the basis of one of or both spatial resolution (frame size) and time resolution (frame rate). In addition, the region setting section 12 may set the regions on the basis of necessity of real-time encoding (ordered by a user or designated by the system, for example). The region setting section 12 may set one or more slices as dependent slices. In a case in which a plurality of regions are set in an image by the region setting section 12, processing by a subtraction section 13 to processing by an inter-prediction section 40 is executed for each region by the chips assigned to the regions. The region setting section 12 outputs image data to the subtraction section 13, an intra-prediction section 30, and the inter-prediction section 40. In addition, the region setting section 12 generates a region dividing parameter that indicates a region dividing form and outputs the generated region dividing parameter to the lossless encoding section 16.

The subtraction section 13 calculates prediction error data which is a difference between the image data input from the region setting section 12 and predicted image data and outputs the calculated prediction error data to the orthogonal transform section 14.

The orthogonal transform section 14 performs an orthogonal transform process on each of one or more conversion blocks configured in each region. The orthogonal transform performed here may be, for example, a discrete cosine transform or a discrete sine transform. More specifically, the orthogonal transform section 14 transforms, for each conversion block, the prediction error data input from the subtraction section 13 into transform coefficient data in the frequency domain from an image signal in the spatial domain. Then, the orthogonal transform section 14 outputs the transform coefficient data to the quantization section 15.

The transform coefficient data input from the orthogonal transform section 14 is fed to the quantization section 15 along with a rate control signal fed from the rate control section 18 which will be described later. The quantization section 15 quantizes the transform coefficient data by a quantization step determined in accordance with the rate control signal. The quantization section 15 outputs the quantized transform coefficient data (hereinafter, referred to as quantized data) to the lossless encoding section 16 and the inverse quantization section 21.

The lossless encoding section 16 encodes the quantized data input from the quantization section 15 for each region thereby generating an encoded stream. In addition, the lossless encoding section 16 encodes various parameters to be referred to by a decoder and inserts the encoded parameters into the encoded stream. The parameters encoded by the lossless encoding section 16 can include the above-described region dividing parameter, information regarding intra-prediction, and information regarding inter-prediction. The lossless encoding section 16 outputs the generated encoded stream to the accumulation buffer 17.

The accumulation buffer 17 is a buffer that temporarily accumulate an encoded stream input from the lossless encoding section 16. The accumulation buffer 17 outputs the accumulated encoded stream to a transmission section (for example, a communication interface, a connection interface for connection with peripheral devices, or the like), which is not illustrated, at a rate in accordance with a band of a transmission path.

A rate control section 18 monitors a free space in the accumulation buffer 17. Then, the rate control section 18 generates a rate control signal in accordance with the free space in the accumulation buffer 17 and outputs the generated rate control signal to a quantization section 15. For example, the rate control section 18 generates a rate control signal for reducing a bit rate of quantization data when the free space in the accumulation buffer 17 is small. In addition, the rate control section 18 generates a rate control signal for raising the bit rate of the quantization data when the free space in the accumulation buffer 17 is sufficiently large, for example.

The inverse quantization section 21, the inverse orthogonal transform section 22, and the addition section 23 constitute a local decoder. The local decoder takes a role of reconstructing an original image from encoded data.

The inverse quantization section 21 performs de-quantization on the quantized data by the same quantization step as used by the quantization section 15 to thereby restore the transform coefficient data. Then, the inverse quantization section 21 outputs the restored transform coefficient data to the inverse orthogonal transform section 22.

The inverse orthogonal transform section 22 performs an inverse orthogonal transform process on the transform coefficient data input from the inverse quantization section 21 to thereby restore the prediction error data. Then, the inverse orthogonal transform section 22 outputs the restored prediction error data to the addition section 23.

The addition section 23 adds the restored prediction error data input from the inverse orthogonal transform section 22 to the predicted image data generated by the intra-prediction section 30 or the inter-prediction section 40 to thereby generate decoded image data (reconstructed image). Then, the addition section 23 outputs the generated decoded image data to the deblocking filter 24 and the frame memory 26.

The deblocking filter 24 and the SAO filter 25 are both in-loop filters for improving image quality of reconstructed images. The deblocking filter 24 removes block distortions by filtering the decoded image data input from the addition section 23, and outputs the filtered decoded image data to the SAO filter 25. The SAO filter 25 removes noises by applying an edge offset process or a band offset process to the decoded image data input from the deblocking filter 24, and outputs the processed decoded image data to the frame memory 26.

The frame memory 26 stores the un-filtered decoded image data input from the addition section 23 and the decoded image data to which in-loop filtering has been applied input from the SAO filter 25 in a storage medium.

The switch 27 reads the un-filtered decoded image data to be used for the intra-prediction out from the frame memory 26 and supplies the read decoded image data as reference image data to the intra-prediction section 30. Further, the switch 27 reads the filtered decoded image data to be used for the inter-prediction out from the frame memory 26 and supplies the read decoded image data as reference image data to the inter-prediction section 40.

The mode setting section 28 sets a prediction coding mode for each block on the basis of comparison between costs input from the intra-prediction section 30 and the inter-prediction section 40. The mode setting section 28 outputs, for a block for which the intra-prediction mode is set, predicted image data generated by the intra-prediction section 30 to the subtraction section 13 and information regarding intra-prediction to the lossless encoding section 16. Further, the mode setting section 28 outputs, for a block for which an inter-prediction mode is set, predicted image data generated by the inter-prediction section 40 to the subtraction section 13 and outputs information regarding inter-prediction to the lossless encoding section 16.

The intra-prediction section 30 performs an intra-prediction process for each of one or more prediction blocks configured in each region on the basis of original image data and decoded image data. For example, the intra-prediction section 30 evaluates a cost based on a prediction error and an amount of code to be generated for each of prediction mode candidates within a search range. Then, the intra-prediction section 30 selects a prediction mode which minimizes the cost as an optimum prediction mode. In addition, the intra-prediction section 30 generates a predicted image data in accordance with the selected optimum prediction mode. Then, the intra-prediction section 30 outputs information regarding intra-prediction including prediction mode information indicating the optimum prediction mode, a corresponding cost, and the predicted image data to the mode setting section 28.

The inter-prediction section 40 executes inter-prediction processing (motion compensation) for each of one or more prediction blocks in each region on the basis of original image data and decoded image data. For example, the inter-prediction section 40 generates the set of reference pixels by acquiring reference pixels at the integer pixel positions from a reference image for motion compensation that is expressed by the decoded image data and calculating the reference pixel values at the fractional pixel positions from the reference pixels by using the interpolation filter. In addition, the inter-prediction section 40 searches a prediction block to be encoded for a motion vector by using the set of generated reference pixels. The inter-prediction section 40 may support merge encoding in which motion information that is common to that of the adjacent block is applied to the prediction block. According to an embodiment, the aforementioned restriction C1 and restriction C2 are imposed on the motion vector search. The aforementioned restriction C3 is imposed on selection of the merge mode. Under the restriction, the inter-prediction section 40 selects a prediction mode that minimizes cost as an optimal prediction mode. In addition, the inter-prediction section 40 generates predicted image data in accordance with the motion vector corresponding to the selected optimal prediction mode. Then, the inter-prediction section 40 outputs the information related to the inter-prediction, the corresponding cost, and the predicted image data to the mode setting section 28.

3-2. Configuration of Inter-Prediction Section

Figure 7:
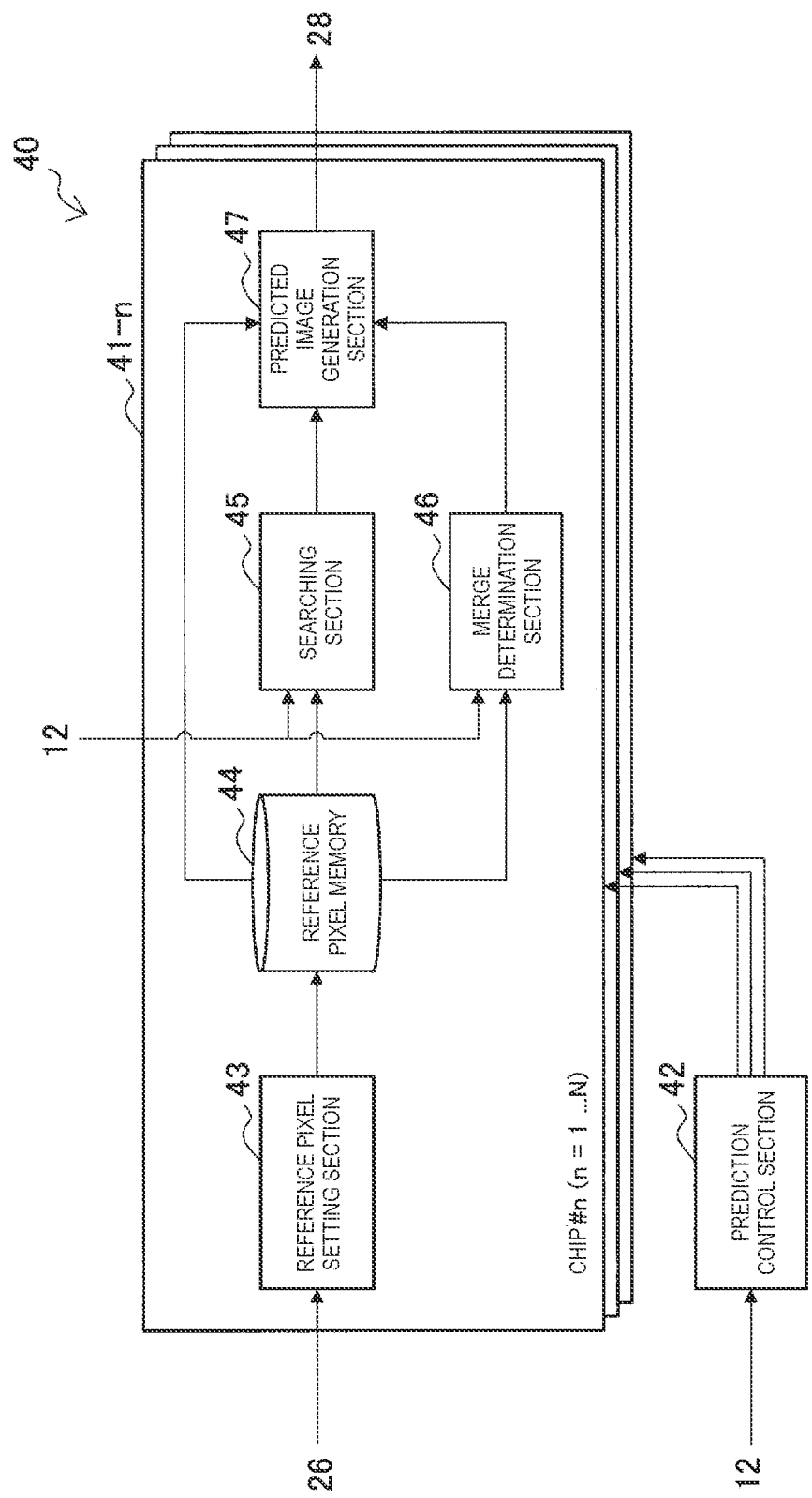
FIG. 7 is a block diagram illustrating an example of a detailed configuration of the inter-prediction section illustrated in FIG. 6.

FIG. 7 is a block diagram illustrating an example of a detailed configuration of the inter-prediction section illustrated in FIG. 6. Referring to FIG. 7, the inter-prediction section 40 includes N chips 41–n (n=1, N) and a prediction control section 42. Each chip 41–n includes a reference pixel setting section 43, a reference pixel memory 44, a searching section 45, a merge determination section 46, and a predicted image generation section 47.

The prediction control section 42 causes the chip 41–n assigned to each of one or more regions (slices or tiles) in the image to execute inter-prediction of the region in accordance with setting performed by the region setting section 12. The prediction control section 42 may cause the corresponding chip 41–n to execute, in parallel, the inter-prediction on a plurality of partial regions in a case in which the partial regions are set in the image. The image to be encoded is assumed to be divided into at least two partial regions in the following description. That is, partial regions corresponding to the plurality of slices or tiles are set in the image to be encoded. Then, two mutually adjacent partial regions are processed by separate chips. On such assumption, functions and roles of the respective parts in the inter-prediction section 40 will be described while focusing on handling of reference pixels in the vicinity of a region boundary, in particular. A region assigned as a target of inter-prediction on a certain chip is referred to as a "target region" on the chip.

The reference pixel setting section 43 sets the set of reference pixels referred for the inter-prediction on the target region and causes the reference pixel memory 44 to store the pixel values in the set of reference pixels that has been set. The set of reference pixels referred for the inter-prediction includes the reference pixels at the integer pixel positions included in the reference image data that is input from the frame memory 26 and the reference pixels at the fractional pixel positions generated by the interpolation filter, which has been described above, from the reference pixels at the integer pixel positions.

The reference pixel setting section 43 include, in the set of reference pixels for the target region, at least the reference pixels at the integer pixel positions in the range of the target region (that is, inside the boundary). Further, in a certain example, the reference pixel setting section 43 may include, in the set of reference pixels for the target region, reference pixels at the integer pixel positions on an inner side than a predetermined distance |D1| from the boundary of the target region toward the outer side. The reference pixel setting section 43 acquires the pixel values of the reference pixels at these integer pixel positions from the frame memory 26 and causes the reference pixel memory 44 to store the pixel values. The reference pixels at the integer pixel positions on the further outer side than the distance |D1| from the boundary of the target region toward the outer side are excluded from the set of reference pixels in order to save the memory resource and reduce the inter-chip communication. In the case in which the distance D1 is equal to zero, the range of the integer pixel position stored in the reference pixel memory 44 is equal to the target region. In this case, the inter-chip communication with another chip that processes the adjacent region is not necessary. Meanwhile, the prediction precision of the inter-prediction can be improved with more consumption of the memory resource as more reference pixels outside the region are added to the set of reference pixels (that is, as the value |D1| becomes greater).

Further, the reference pixel setting section 43 include, in the set of reference pixels for the target region, the reference pixels at the fractional pixel positions on the further inner side than the predetermined distance D2 from the boundary of the target region. The distance D2 is determined to be in the filter tap direction of the interpolation filter that is used for generating the reference pixels at the individual fractional pixel positions. The reference pixel setting section 43 calculates the pixel values of the reference pixels at these fractional pixel positions by the interpolation filter, which has been described above with reference to FIG. 1, on the basis of the reference pixel values at the integer pixel positions. Then, the reference pixel setting section 43 causes the reference pixel memory 44 to store the calculated pixel values of the reference pixels at the fractional pixel positions. The reference pixels at the fractional pixel positions on the further outer side than the predetermined distance D2 from the boundary of the target region are excluded from the set of reference pixels that are used for searching the target region for the motion vector. In a case in which the distances D1 and D2 are defined from the viewpoint of the number of pixels toward the inner side of the target region, a relationship between the distance D1 and the distance D2 can be expressed as the aforementioned Equation (1) by using the maximum length Nw of the filter tap of the interpolation filter. In a case in which D1=0 and Nw=8, D2=4, and the reference pixels at the fractional pixel positions on the outer side than the four pixels from the region boundary between the target region and the adjacent region toward the inner side of the target region are excluded from the set of reference pixels as exemplified in FIG. 4. In A case in which D1=−4 and $N_{IF}$=8, D2=0, and the reference pixel values at all the fractional pixel positions in the target region is stored in the reference pixel memory 44 and are included in the search range of the motion vector.

The reference pixel memory 44 buffers the pixel values of the set of reference pixels in the target region set by the reference pixel setting section 43. As described above, the set of reference pixels stored in the reference pixel memory 44 includes at least the reference pixels at the integer pixel positions in the range of the target region. In addition, the set of reference pixels stored in the reference pixel memory 44 also includes the reference pixels at the fractional pixel positions on the further inner side than the distance D2 from the region boundary toward the inner side. In a case in which there is a sufficient available amount of memory resource, the set of reference pixels stored in the reference pixel memory 44 can also include the reference pixels in a broader range.

The searching section 45 searches for the motion vector that most satisfactorily expresses motion of an object for each prediction block in the target region while setting the set of reference pixels stored in the reference pixel memory 44 as the search range. The searching section 45 may roughly narrow down motion vector candidates by using only the reference pixels at the integer pixel positions and then decide the optimal motion vector by using the reference pixels at the fractional pixel positions in a reduced narrow range. Instead of such stepwise search, the searching section 45 may search for the motion vector at once by using both the reference pixels at the integer pixel positions and the reference pixels at the fractional pixel positions. By the stepwise search, it is possible to reduce the number of times the interpolation filter computation is performed for generating the reference pixels at the fractional pixel positions and to suppress processing cost. The searching section 45 outputs motion vector information that indicates the optimal motion vector induced as a result of the search and the corresponding cost to the predicted image generation section 47.

The merge determination section 46 conducts the search, for merge encoding. The merge determination section 46 determines a merge candidate that has a motion vector that most satisfactorily expresses motion of the object in the prediction block in the merge candidate list for each prediction block in the target region. At that time, the merge determination section 46 excludes, from the merge candidate list, merge candidates that have motion vectors, for which the reference pixels that are not buffered by the reference pixel memory 44 are referred to in a case of an application to the prediction block, in one or more merge candidates in accordance with the aforementioned restriction C3. In the example of FIG. 5, the merge candidate list can include the adjacent block on the upper side and the adjacent block on the left side. More generally, the merge candidate list can include a maximum of five merge candidates from among a variety of candidates such as adjacent blocks on the upper left side, the upper side, the upper right side, the left side, and the lower left side and temporal merge candidates. The merge determination section 46 may refill the merge candidate list with other alternative merge candidates in a case in which the merge candidates are excluded from the merge candidate list in accordance with the aforementioned restriction C3. The merge determination section 46 outputs merge information that represents an optimal merge mode induced as a result of merge determination (a merge index indicating any of the merge candidates, for example) and the corresponding cost to the predicted image generation section 47.

The predicted image generation section 47 selects a mode with lower cost in either motion vector information encoding (for example, adaptive motion vector prediction encoding (AMVP)) or merge encoding by comparing cost input from the searching section 45 with cost input from the merge determination section 46 for each prediction block. Then, the predicted image generation section 47 generates a predicted image of each prediction block in accordance with the selected mode and outputs the generated predicted image, the corresponding cost, and information related to the inter-prediction to the mode setting section 28.

The prediction control section 42 may impose the aforementioned restriction C1, C2, and C3 on the processing executed by each chip regardless of the type of the target region assigned to each chip. In this case, the reference pixels at the fractional pixel positions in the vicinity of the region boundary, for example, are excluded from the reference pixels for the motion search regardless of the type of the region. The type of the target region described herein can include two or more of an independent slice, a dependent slice, and a tile. By imposing the restriction regardless of the type of the region, implementation of the encoder becomes easier as a result of a logic of the inter-prediction processing being simplified. Instead, the prediction control section 42 may impose the aforementioned restriction C1, C2, and C3 on the processing executed by a certain chip only in a case in which the target region assigned to the chip is a dependent slice. In a case in which such switching of logics based on the type of the region is provided, there is a possibility that the prediction precision of the inter-prediction increases.

In addition, the prediction control section 42 may impose the aforementioned restriction C1, C2, and C3 regardless of which of the boundary between the target region and the adjacent region and the picture end the region boundary is. In this case, the reference pixels at the fractional pixel positions not only in the vicinity of the region boundary but also in the vicinity of the picture end are also excluded from the reference pixels for the motion search, for example. In such an example, the logic of the inter-prediction processing is further simplified. Instead, the prediction control section 42 may exclude the reference pixels at the fractional pixel positions in the vicinity of the boundary from the set of reference pixels only in a case in which the boundary is a boundary (not a picture end) between the target region and the adjacent region. Since there is a case in which processing different from the motion search generates the reference pixel values outside the region through mirroring for the picture end, no large difference occurs in the effect of saving the memory resource even of the picture end is excluded from the targets of the aforementioned restriction C1, C2, and C3.

Figure 8A:
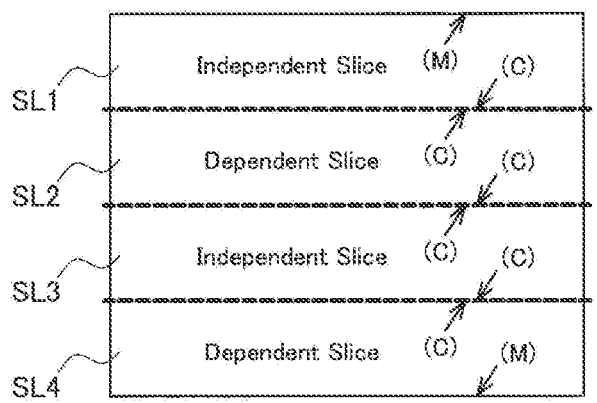
FIG. 8A is an explanatory diagram for explaining a first example of handling of filter taps for each type of region.

FIG. 8A is an explanatory diagram for explaining a first example of handling of filter taps for each type of region. In the first example, the restriction C1, C2, and C3 are applied regardless of the type of the region. However, the restriction is not applied to the picture end. Referring to FIG. 8A, four slices SL1, SL2, SL3, and LS4 are set in the image to be encoded. For example, the slices SL1 and SL3 are processed by a first chip, and the slices SL2 and SL4 are processed by a second chip. Since the first chip generates the set of reference pixels through mirroring in the vicinity of the boundary on the upper side of the slice SL1 since the boundary corresponds to the picture end (the reference pixels at the fractional pixel positions can be included in the search range of the motion search even in the vicinity of the boundary). Meanwhile, the first chip applies the restriction C1, C2, and C3 to the boundary on the lower side regardless of the fact that the slice SL1 is an independent slice since the boundary on the lower side of the slice SL1 corresponds to the region boundary with the adjacent region SL2. The Second chip applies the restriction C1, C2, and C3 to both the boundaries on the upper side and the lower side since the boundaries on the upper side and the lower side of the slice SL2 correspond to the region boundaries with the adjacent regions SL1 and SL3, respectively. The first chip applies the restriction C1, C2, and C3 to both the boundaries on the upper side and the lower side regardless of the fact that the slice SL3 is an independent slice since the boundaries on the upper side and the lower side of the slice SL3 correspond to the region boundaries with the adjacent regions SL2 and SL4, respectively. The second chip applies the restriction C1, C2, and C3 to the boundary on the upper side since the boundary on the upper side of the slice SL4 corresponds to the region boundary with the adjacent region SL3. Meanwhile, the second chip generates the set of reference pixels through mirroring in the vicinity of the boundary since the boundary on the lower side of the slice SL4 corresponds to the picture end.

Figure 8B:
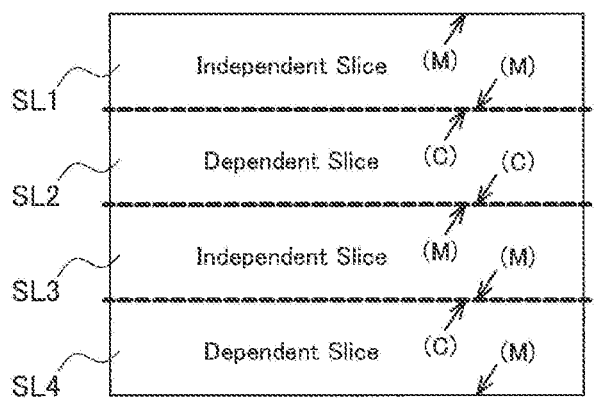
FIG. 8B is an explanatory diagram for explaining a second example of handling of filter taps for each type of region.

FIG. 8B is an explanatory diagram for explaining a second example of handling filter taps for each type of region. In the second example, the restriction C1, C2, and C3 are applied only to the region boundary with the adjacent region among the dependent slices. Referring to FIG. 8A, four slices SL1, SL2, SL3, and SL4 set in the image to be encoded are illustrated again. Here, the slices SL1 and SL3 are processed by the first chip, and the slices SL2 and SL4 are processed by the second chip. The first chip does not apply the restriction C1, C2, and C3 to the boundary on the lower side that is a region boundary with the adjacent region SL2 in addition to the boundary on the upper side corresponding to the picture end since the slice SL1 is an independent slice. The second chip applies the restriction C1, C2, and C3 to both the boundaries on the upper side and the lower side since the boundaries on the upper side and the lower side of the slice SL2 that is a dependent slice correspond to the region boundary with the adjacent regions SL1 and SL3, respectively. The first chip does not apply the restriction C1, C2, and C3 to both the boundaries on the upper side and the lower side of the slice SL3 since the slice SL1 is an independent slice. The second chip applies the restriction C1, C2, and C3 to the boundary on the upper side since the boundary on the upper side of the slice SL4 that is a dependent slice corresponds to the region boundary with the adjacent region SL3. Meanwhile, the second chip generates the set of reference pixels through mirroring in the vicinity of the boundary on the lower side of the slice SL4 since the boundary corresponds to the picture end.

4. FLOW OF PROCESSING AT TIME OF ENCODING

(1) Overall Flow

Figure 9:
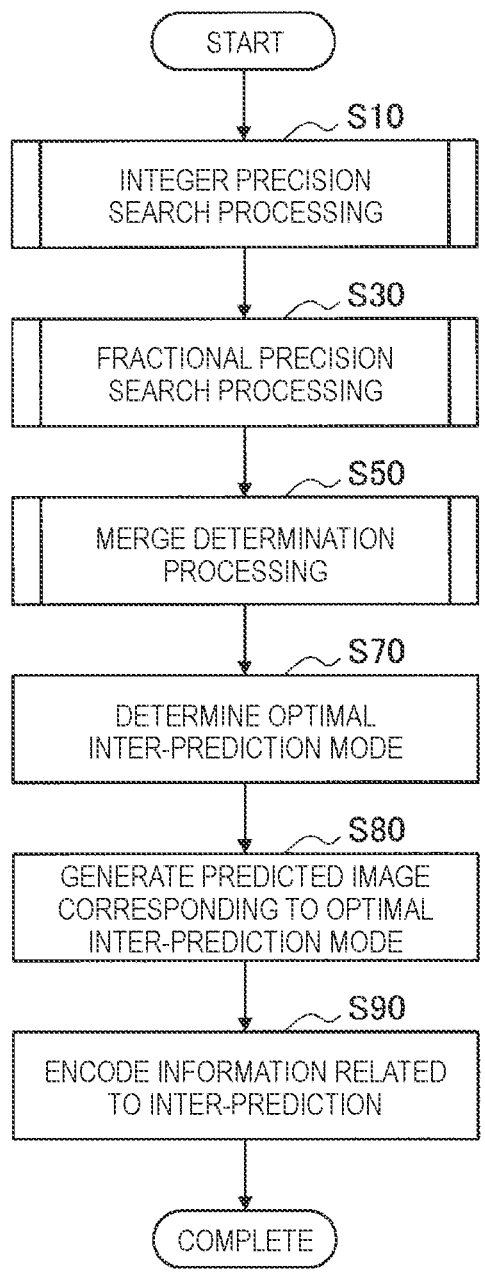
FIG. 9 is a flowchart illustrating an example of a flow of inter-prediction processing according to an embodiment.

FIG. 9 is a flowchart illustrating an example of a flow of inter-prediction processing according to an embodiment. The inter-prediction processing illustrated in FIG. 9 is repeated by a certain chip, for example, for each of one or more prediction blocks in the target region assigned to the chip.

First, the prediction control section 42 causes the searching section 45 to execute integer precision search processing (Step S10). In addition, the prediction control section 42 causes the searching section 45 to execute fractional precision search processing on the basis of the result of the integer precision search processing (Step S30). The searching section 45 outputs results of the integer precision search processing and the fractional precision search processing to the predicted image generation section 47. In addition, the prediction control section 42 causes the merge determination section 46 to execute merge determination processing (Step S50). The merge determination section 46 outputs a result of the merge determination processing to the predicted image generation section 47. The predicted image generation section 47 determines that a mode with a lower cost in either the encoding of the motion vector information or the merge encoding is an optimal inter-prediction mode (Step S70). Then, the predicted image generation section 47 generates a predicted image corresponding to the determined optimal inter-prediction mode (Step S80) and outputs the generated predicted image, the corresponding cost, and the information related to the inter-prediction to the mode setting section 28. In a case in which the inter-prediction mode is selected by the mode setting section 28, the information related to the inter-prediction is encoded by the lossless encoding section 16 (Step S90).

(2) Integer Precision Search Processing

Figure 10:
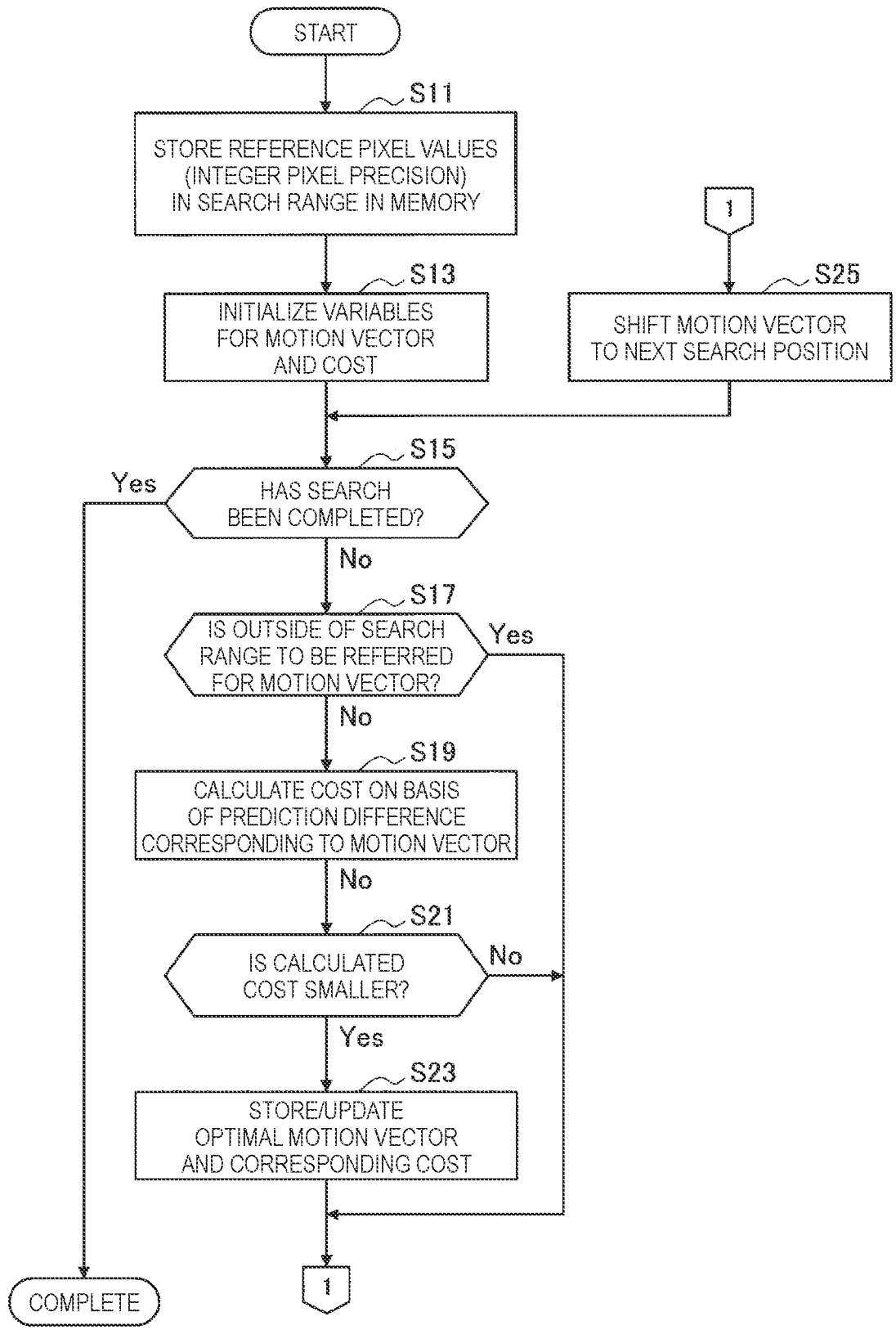
FIG. 10 is a flowchart illustrating an example of a detailed flow of integer precision search processing illustrated in FIG. 9.

FIG. 10 is a flowchart illustrating an example of a detailed flow of the integer precision search processing illustrated in FIG. 9. Referring to FIG. 10, the reference pixel setting section 43 stores the pixel values of the reference pixels at the integer pixel positions in the search range in the reference pixel memory 44 prior to the start of the search (Step S11). The search range described herein may be equal to the target region or may include pixels in the adjacent region that is adjacent to the target region. The searching section 45 initializes variables for the motion vector and the cost (Step S13).

The processing in Steps S17 to 25 is repeated until the search for motion vectors related to all reference destinations in the search range is completed (Step S15). Here, motion vectors as targets of the search processing will be referred to as target motion vectors. In each repetition, the searching section 45 skips calculation of the cost (Step S17) and simply updates the target motion vector so as to refer to the next search position in a case in which the outside of the search range is referred for the target motion vector. In a case in which the inside of the search range is referred for the target motion vector, the searching section 45 calculates the cost corresponding to the target motion vector on the basis of a prediction difference corresponding to the target motion vector (Step S19). The searching section 45 updates (stores) the value of the variable that represents the optimal motion vector and also updates (stores) the corresponding cost (Step S23) in a case in which the calculated cost is smaller than the minimum cost obtained until the previous repetition. Then, the searching section 45 updates the target motion vector so as to refer to the next search position (Step S25).

If the determination of the cost for target motion vectors associated with all the reference destinations in the search range is completed, an optimal motion vector stored at that time is recognized to be the one that most satisfactorily expresses the motion of the object with integer pixel precision. The fractional precision search processing described below can be executed after the search range has been narrowed down in the vicinity of the reference destination indicated by the optimal motion vector with the integer pixel precision obtained as a result of such integer precision search processing.

(3) Fractional Precision Search Processing

Figure 11:
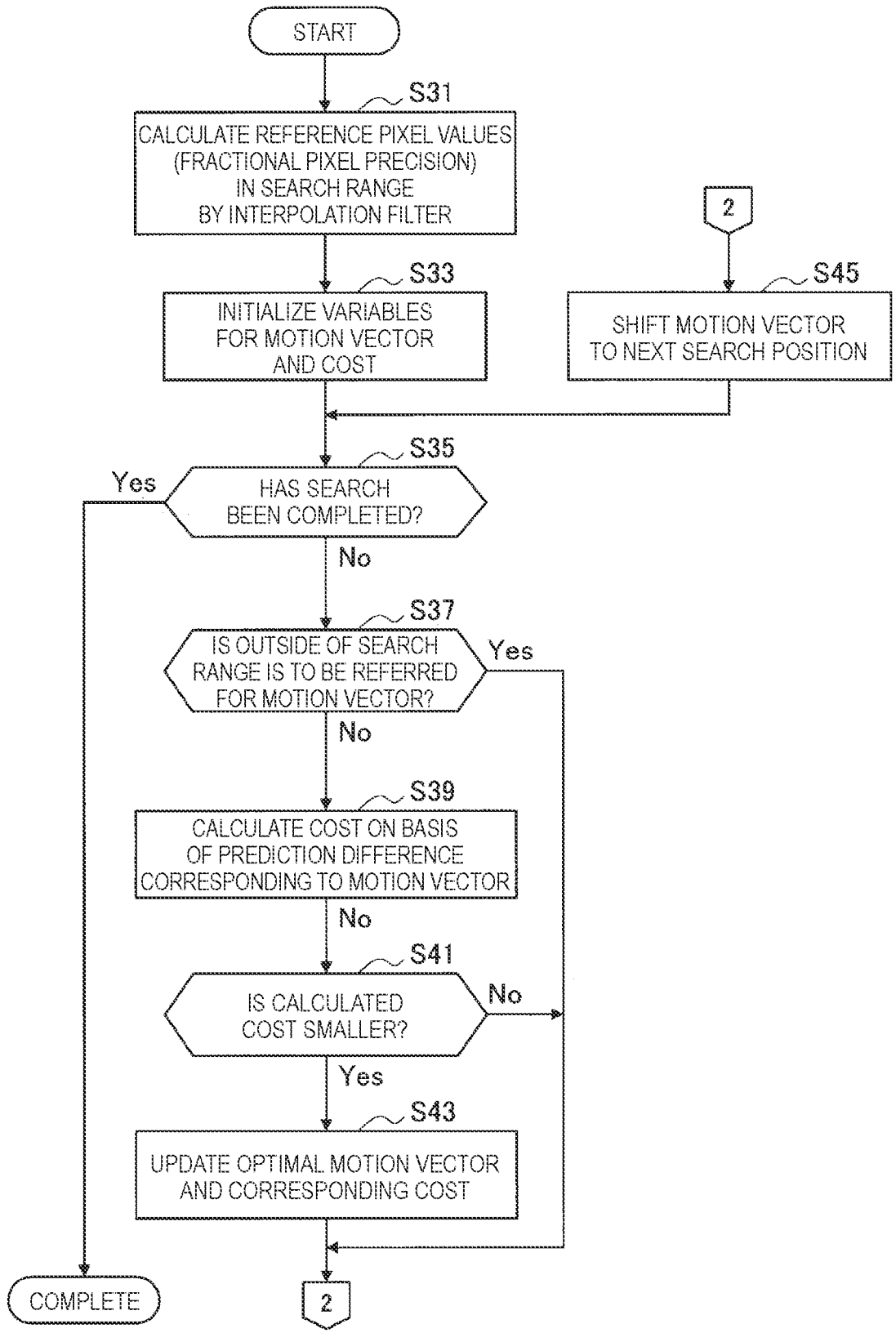
FIG. 11 is a flowchart illustrating an example of a detailed flow of fractional precision search processing illustrated in FIG. 9.

FIG. 11 is a flowchart illustrating an example of a detailed flow of the fractional precision search processing illustrated in FIG. 9. Referring to FIG. 11, the reference pixel setting section 43 calculates pixel values of reference pixels at fractional pixel positions in the search range by the interpolation filter on the basis of the pixel values at the integer pixel positions buffered by the reference pixel memory 44 (Step S31). The search range of the fractional pixel positions is smaller than the search range of the integer pixel positions by the amount corresponding to the number of pixels that depend on the filter tap length of the interpolation filter even if there is no narrowing down based on the result of the integer precision search processing. The reference pixel setting section 43 stores the pixel values of the reference pixels at the fractional pixel positions that are sequentially calculated by the interpolation filter in the reference pixel memory 44. The searching section 45 initializes the variables for the motion vector and the cost to the optimal motion vector and the corresponding cost obtained by the integer precision search processing (Step S33).

The processing in Steps S37 to S45 is repeated until the search for the target motion vectors associated with all the reference destinations (that indicate the fractional pixel positions) in the search range after the narrowing down is completed (Step S35). In each repetition, the searching section 45 skips the calculation of the cost (Step S37) and simply updates the target motion vector to refer to the next search position in a case in which the outside of the search range (for example, the further outer side than the predetermined distance from the region boundary) is referred for the target motion vector. In a case in which the inside of the search range is referred for the target motion vector, the searching section 45 calculates the cost corresponding to the target motion vector on the basis of a prediction difference corresponding to the target motion vector (Step S39). The searching section 45 updates the values of the variable that represents the optimal motion vector and updates the corresponding cost (Step S43) in a case in which the calculated cost is smaller than the minimum cost obtained until the previous repetition (Step S41). Then, the searching section 45 updates the target motion vector to refer to the next search position (S45).

If the determination of the cost for the target motion vectors associated with all the reference destinations in the search range is completed, the optima motion vector stored at that timing is regarded as a final result of the motion search with the fractional pixel precision.

Figure 12:
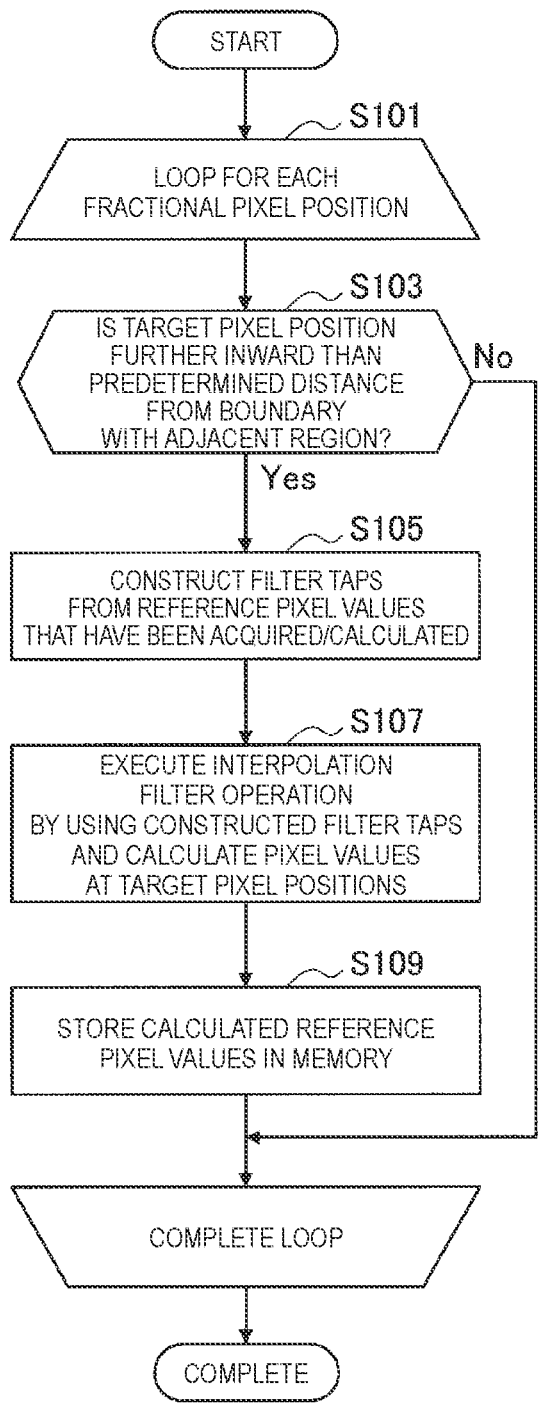
FIG. 12 is a flowchart illustrating an example of a further detailed flow of interpolation filter operation illustrated in FIG. 11.

FIG. 12 illustrates an example of a further detailed flow of the interpolation filter operation in Step S31 in FIG. 11. The processing in Steps S103 to S109 illustrated in FIG. 12 is repeated for each of the fractional pixel positions in the search range after the narrowing-down (Step S101). Here, the fractional pixel positions as targets of the interpolation will be referred to as target pixel positions. In each repetition, the reference pixel setting section 43 determines whether or not the target pixel positions are present further inward than the predetermined distance D2 from the region boundary with the adjacent region (Step S103). In a case in which the target pixel positions are present on the further inner side than the predetermined distance D2 from the region boundary, the reference pixel setting section 43 constructs filter taps of the interpolation filter for calculating the pixel values at the target pixel positions from the reference pixel values at the integer pixel positions which have already been acquired and/or the reference pixel values at the fractional pixel positions that have been calculated (Step S105). Next, the reference pixel setting section 43 calculate the pixel values at the target pixel positions by executing an interpolation filter operation using the constructed filter taps (Step S107). Then, the reference pixel setting section 43 stores the calculated reference pixel values at the target pixel positions in the reference pixel memory 44 (Step S109). In a case in which the target pixel positions are on the further outer side than the predetermined distance D2 from the region boundary with the adjacent region, the reference pixel setting section 43 skips the calculation of the reference pixel values by using the interpolation filter.

(4) Merge Determination Processing

Figure 13:
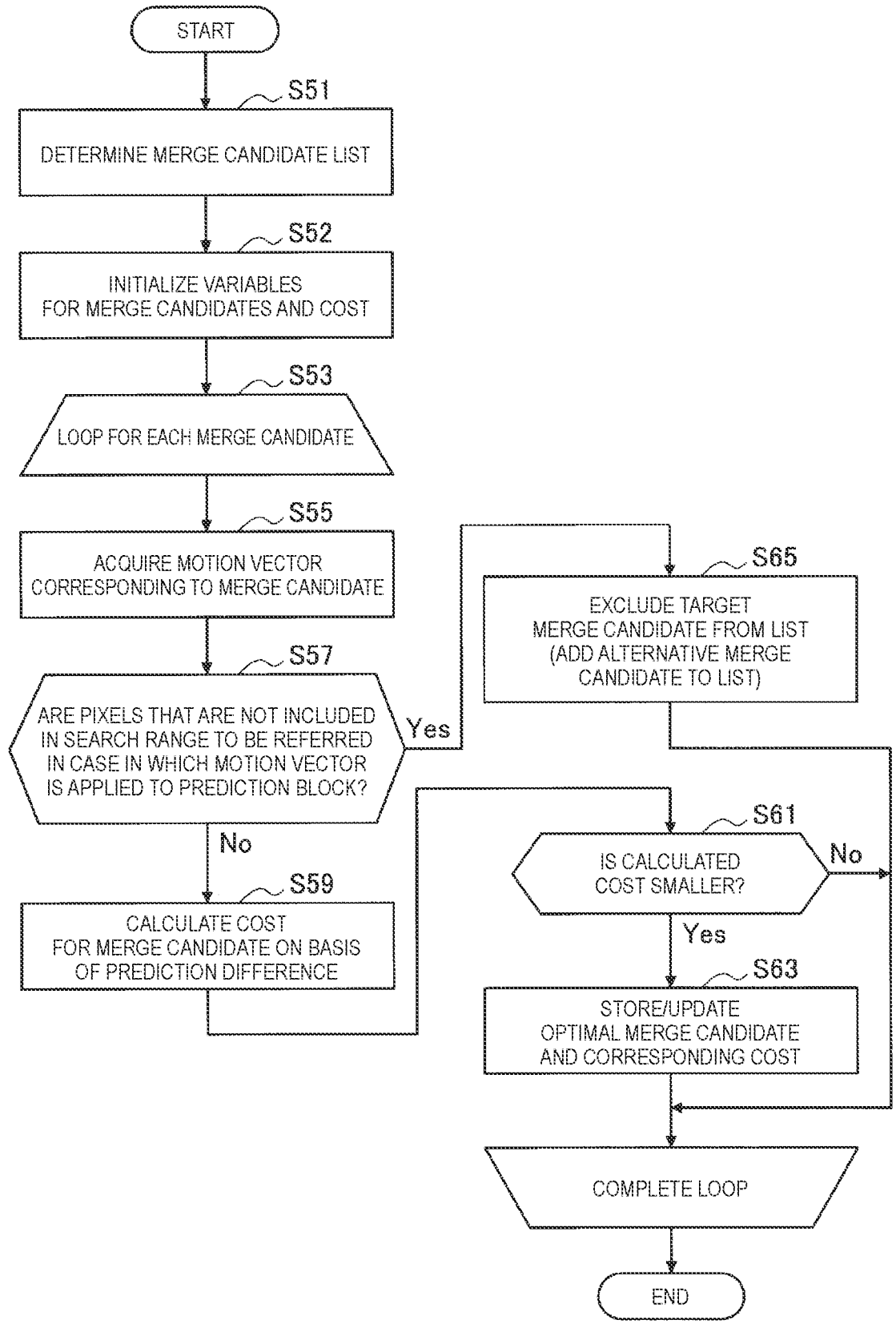
FIG. 13 is a flowchart illustrating an example of a detailed flow of merge determination processing illustrated in FIG. 9.

FIG. 13 is a flowchart illustrating an example of a detailed flow of the merge determination processing illustrated in FIG. 9. Referring to FIG. 13, the merge determination section 46 decides a merge candidate list for a prediction block (Step S51). The merge candidate list decided here can include some of candidates such as adjacent blocks on an upper left side, an upper side, an upper right side, a left side, and a lower left side of the prediction block and temporal merge candidates. In addition, the merge determination section 46 initializes the variables for the merge candidates and the cost (Step S52).

The following processing in Steps S55 to S63 is repeated for each of the merge candidates in the decided merge candidate list (Step S53). Here, the merge candidates as targets of the repetition will be referred to as target merge candidates. In each repetition, the merge determination section 36 acquires a motion vector corresponding to a target merge candidate first (that is, a motion vector that has been set for the target merge candidate) (Step S55). Next, the merge determination section 46 determines whether or not to refer to pixels that are not included in the search range in a case in which the acquired motion vector is applied to the prediction block (Step S57). In a case in which the acquired motion vector is applied to the prediction block and the pixels that are not included in the search range is not referred, the merge determination section 46 calculates the cost on the basis of the prediction difference for the target merge candidate (Step S59). In a case in which the calculate cost is smaller than the minimum cost obtained until the previous repetition (Step S61), the merge determination section 46 updates the value of the variable that represents the optimal merge candidate to the target merge candidate and also updates the corresponding cost (Step S63).

In a case in which the motion vector acquired in Step S55 is applied to the prediction block, and the pixels that are not included in the search range is referred, the merge determination section 46 excludes the target merge candidate from the merge candidate list and skips the calculation of the cost for the target merge candidate (Step S65). In this case, the merge determination section 46 may add another alternative merge candidate to the merge candidate list.

If the determination of the cost for all the merge candidates remaining in the merge candidate list without being excluded therefrom is completed, the optimal merge candidate stored at that timing is regarded as a final result of the merge determination processing.

5. CONFIGURATION OF DECODER

Figure 14:
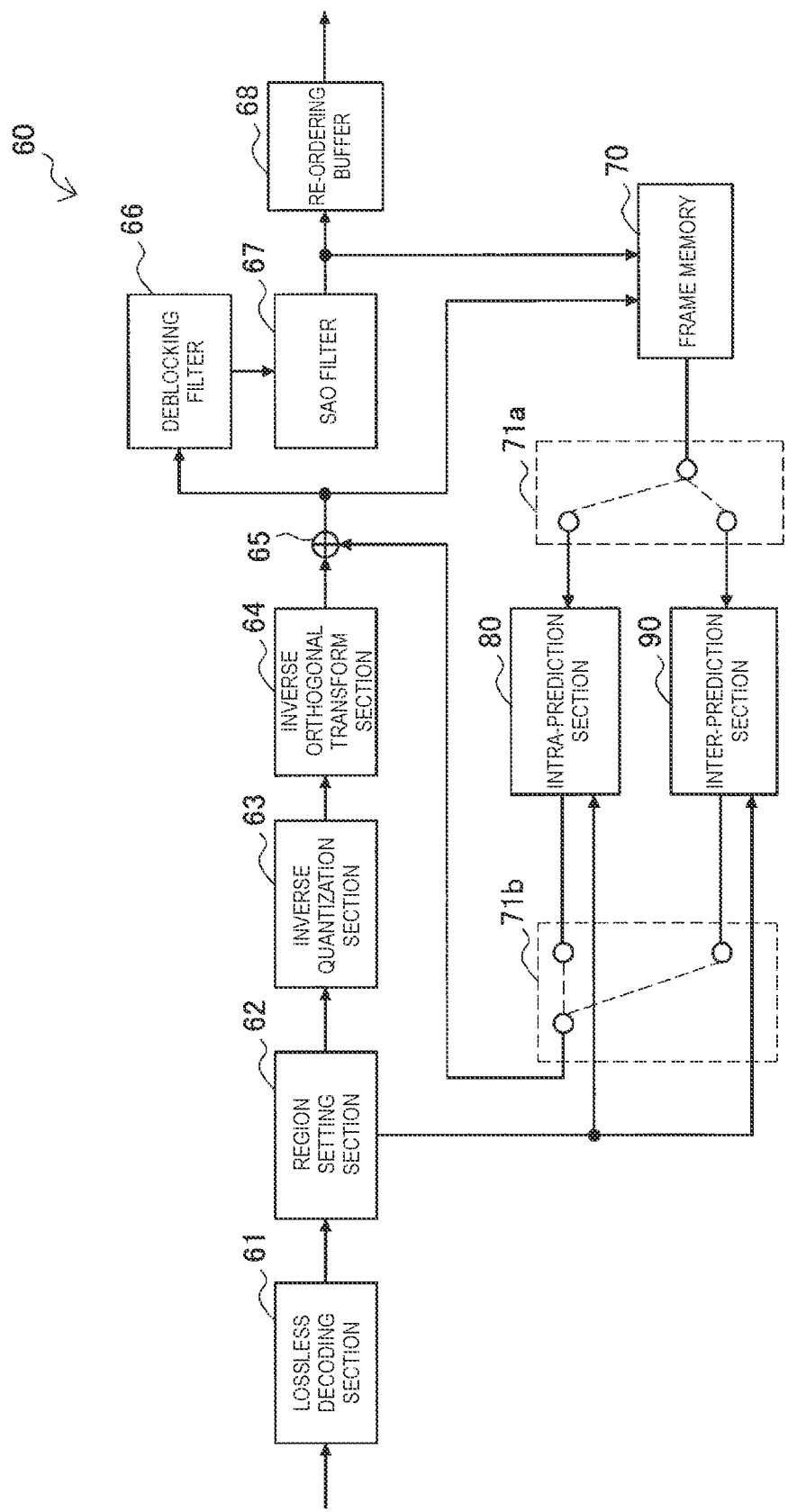
FIG. 14 is a block diagram illustrating an example of a configuration of an image decoding device.

FIG. 14 is a block diagram illustrating an example of a configuration of the image decoding device 60. Referring to FIG. 14, the image decoding device 60 includes a lossless decoding section 61, a region setting section 62, an inverse quantization section 63, an inverse orthogonal transform section 64, an addition section 65, a deblocking filter 66, an SAO filter 67, a re-ordering buffer 68, a frame memory 70, selectors 71a and 71b, an intra-prediction section 80, and an inter-prediction section 90.

The lossless decoding section 61 decodes encoded image data and encoded parameters from an encoded stream received from the image encoding device 10 via a transmission section (for example, a communication interface, a connection interface for connection with periphery devices, and the like). The parameters decoded by the lossless decoding section 61 can include a region dividing parameter, information related to the intra-prediction, and information related to the inter-prediction, for example. The lossless decoding section 61 outputs the decoded data and parameters to the region setting section 62.

The region setting section 62 sets one or more regions in each image corresponding to a picture in accordance with the region dividing parameter. The regions described herein correspond to slices or tiles. One or more slices may be set to be dependent slices. The processing described below may be executed by different chips for the respective regions or ay be executed by a single chip. The region setting section 62 outputs decoded quantization data to the inverse quantization section 63. In addition, the lossless decoding section 61 outputs the information related to the intra-prediction to the intra-prediction section 80 and outputs the information related to the inter-prediction to the inter-prediction section 90.

The inverse quantization section 63 de-quantizes the quantized data input from the region setting section 62 by the same quantization step as used in encoding to restore transform coefficient data. The inverse quantization section 63 outputs the restored transform coefficient data to the inverse orthogonal transform section 64.

The inverse orthogonal transform section 64 performs an inverse orthogonal transform on the transform coefficient data input from the inverse quantization section 63 in accordance with an orthogonal transform scheme used in the encoding, thereby generating prediction error data. The inverse orthogonal transform section 64 outputs the generated prediction error data to the addition section 65.

The addition section 65 generates decoded image data by adding the prediction error data input from the inverse orthogonal transform section 64 to predicted image data input from the selector 71b. Then, the addition section 65 outputs the generated decoded image data to the deblocking filter 66 and the frame memory 70.

The deblocking filter 66 removes a block distortion by filtering the decoded image data input from the addition section 65 and outputs the filtered decoded image data to the SAO filter 67.

The SAO filter 67 removes noises by applying an edge offset process or a band offset process to the decoded image data input from the deblocking filter 66 and outputs the processed decoded image data to the re-ordering buffer 68 and the frame memory 70.

The re-ordering buffer 68 generates a series of chronological image data items by reordering images input from the SAO filter 67. Then, the series of image data items generated by the re-ordering buffer 68 can be output as digital image signals to a display (not illustrated) that is connected to the image decoding device 60, for example.

The frame memory 70 stores the unfiltered decoded image data input from the addition section 65 and the filtered decoded image data input from the SAO filter 67 in a storage medium.

The selector 71a switches an output destination of the image data from the frame memory 70 between the intra-prediction section 80 and the inter-prediction section 90 for each block in the image in accordance with mode information acquired by the lossless decoding section 61. In the case where an intra-prediction mode has been designated, for example, the selector 71a outputs the decoded image data that has not been filtered supplied from the frame memory 70 to the intra-prediction section 80 as reference image data. In addition, in the case where an inter-prediction mode has been designated, the selector 71a outputs the filtered decoded image data to the inter-prediction section 90 as reference image data.

The selector 71b switches an output source of the predicted image data to be supplied to the addition section 65 between the intra-prediction section 80 and the inter-prediction section 90 in accordance with mode information acquired by the lossless decoding section 61. In the case where the intra-prediction mode has been designated, for example, the selector 71b supplies the predicted image data output from the intra-prediction section 80 to the addition section 65. In addition, in the case where the inter-prediction mode has been designated, the selector 71b supplies the predicted image data output from the inter-prediction section 90 to the addition section 65.

The intra-prediction section 80 performs an intra-prediction process on the basis of information regarding intra-prediction and the reference image data from the frame memory 70, thereby generating the predicted image data. Then, the intra-prediction section 80 outputs the generated predicted image data to the selector 71b.

The inter-prediction section 90 performs an inter-prediction process on the basis of information regarding inter-prediction and the reference image data from the frame memory 70, thereby generating the predicted image data. Then, the inter-prediction section 90 outputs the generated predicted image data to the selector 71b. According to an embodiment, the aforementioned restriction C1 and restriction C2 are imposed on the motion vector search on the side of the encoder. The aforementioned restriction C3 is imposed on the selection of the merge mode. In this case, a predicted image of a certain partial region can be generated without referring to the reference pixels on the further outer side than the boundary with the adjacent region or on the further outer side than the predetermined distance from the boundary (for example, without requiring interpopulation filter computation based on such reference pixels).

6. APPLICATION EXAMPLES

The image encoding device 10 and the image decoding device 60 according to the above-described embodiments can be applied to various electronic apparatuses such as: transmitters or receivers for satellite broadcasting, wired broadcasting such as cable TV, distribution on the Internet and distribution to terminals through cellular communication; recording devices which record images on media such as optical discs, magnetic disks, and flash memories; or reproduction devices which reproduce images from the foregoing storage media. Four application examples will be described below.

(1) First Application Example

Figure 15:
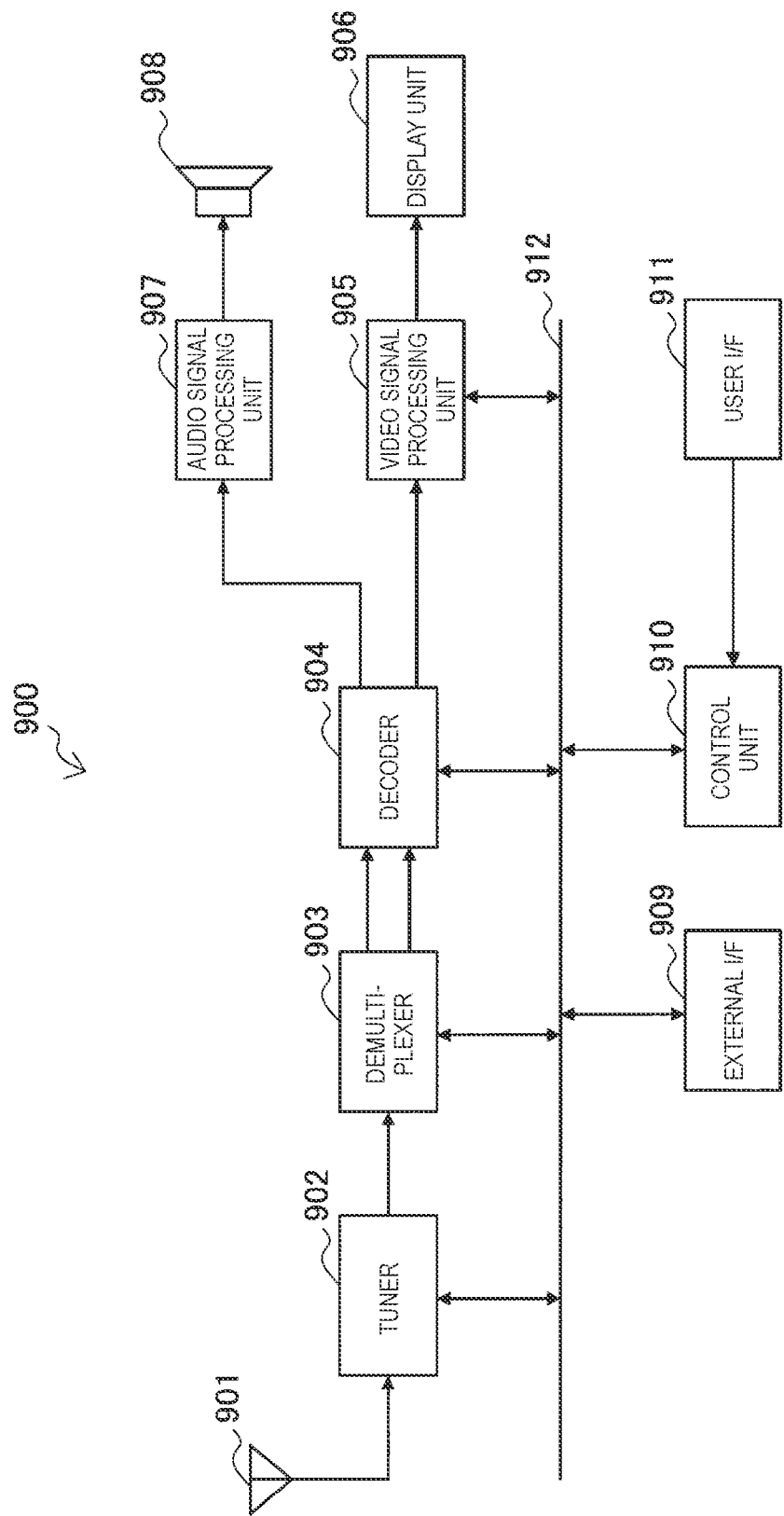
FIG. 15 is a block diagram illustrating an example of a schematic configuration of a television apparatus.

FIG. 15 illustrates an example of a schematic configuration of a television apparatus to which the above-described embodiment is applied. The television apparatus 900 has an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from a broadcasting signal received via the antenna 901 and demodulates the extracted signal. Then, the tuner 902 outputs an encoded bit stream obtained from the demodulation to the demultiplexer 903. That is, the tuner 902 plays a role as a transmission means of the television apparatus 900 which receives an encoded stream in which images are encoded.

The demultiplexer 903 demultiplexes a video stream and an audio stream of a program to be viewed from the encoded stream and outputs the demultiplexed streams to the decoder 904. In addition, the demultiplexer 903 extracts auxiliary data such as an electronic program guide (EPG) from the encoded bit stream and supplies the extracted data to the control unit 910. Note that, in the case where the encoded bit stream has been scrambled, the demultiplexer 903 may perform descrambling.

The decoder 904 decodes the video stream and the audio stream input from the demultiplexer 903. Then, the decoder 904 outputs video data generated from the decoding process to the video signal processing unit 905. In addition, the decoder 904 outputs audio data generated from the decoding process to the audio signal processing unit 907.

The video signal processing unit 905 reproduces the video data input from the decoder 904 to cause the display unit 906 to display a video. In addition, the video signal processing unit 905 may cause the display unit 906 to display an application screen supplied via a network. Furthermore, the video signal processing unit 905 may perform an additional process, for example, noise reduction, on the video data in accordance with a setting. Moreover, the video signal processing unit 905 may generate an image of a graphical user interface (GUI), for example, a menu, a button, or a cursor and superimpose the generated image on an output image.

The display unit 906 is driven with a driving signal supplied from the video signal processing unit 905 and displays a video or an image on a video plane of a display device (e.g., a liquid crystal display, a plasma display, an OLED, etc.).

The audio signal processing unit 907 performs a reproduction process including D/A conversion and amplification on the audio data input from the decoder 904 and causes the speaker 908 to output a sound. In addition, the audio signal processing unit 907 may perform an additional process such as noise removal on the audio data.

The external interface 909 is an interface for connecting the television apparatus 900 to an external apparatus or a network. For example, a video stream or an audio stream received via the external interface 909 may be decoded by the decoder 904. In other words, the external interface 909 also plays the role as a transmission means of the television apparatus 900 which receives an encoded stream in which images are encoded.

The control unit 910 has a processor such as a central processing unit (CPU) and a memory such as a random access memory (RAM) and a read only memory (ROM). The memory stores a program executed by the CPU, program data, EPG data, and data acquired via a network. The program stored in the memory is read and executed by the CPU at the time of, for example, start-up of the television apparatus 900. The CPU controls operations of the television apparatus 900 by executing the program in response to, for example, operation signals input from the user interface 911.

The user interface 911 is connected to the control unit 910. The user interface 911 includes, for example, buttons and switches with which a user operates the television apparatus 900, a reception unit for remote control signals, and the like. The user interface 911 generates an operation signal by detecting an operation by a user via any aforementioned constituent element and outputs the generated operation signal to the control unit 910.

The bus 912 connects the tuner 902, the demultiplexer 903, the decoder 904, the video signal processing unit 905, the audio signal processing unit 907, the external interface 909, and the control unit 910 to one another.

In the television apparatus 900 configured as described above, the decoder 904 has the functions of the image decoding device 60 according to the aforementioned embodiment. Therefore, the television apparatus 900 can receive an encoded stream of a video that is encoded and transmitted in real time and reproduce the video in a form that is more suitable for parallel processing by multiple chips.

(2) Second Application Example

Figure 16:
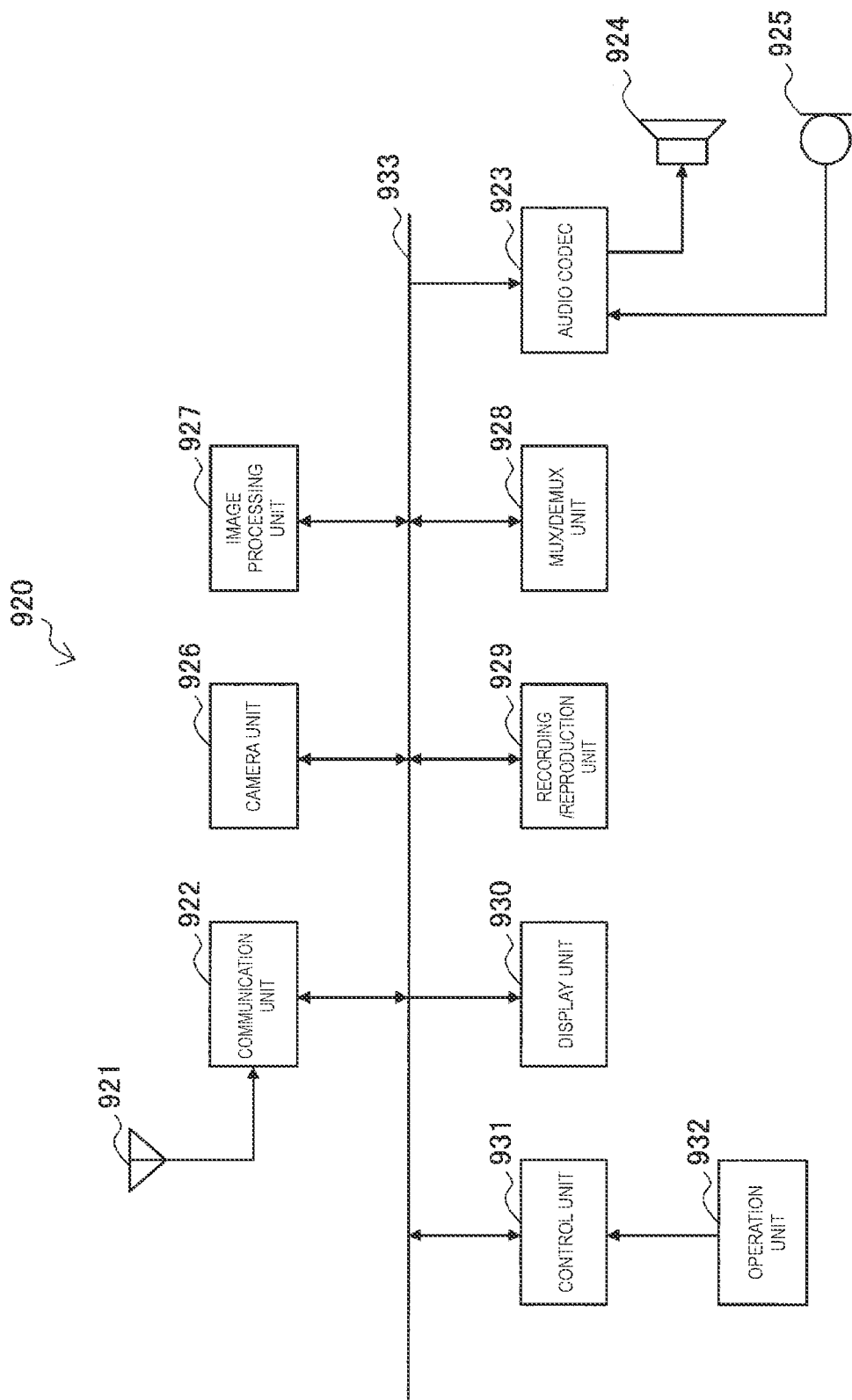
FIG. 16 is a block diagram illustrating an example of a schematic configuration of a mobile phone.

FIG. 16 illustrates an example of a schematic configuration of a mobile telephone to which the above-described embodiments are applied. A mobile telephone 920 includes an antenna 921, a communication unit 922, an audio codec 923, a speaker 924, a microphone 925, a camera unit 926, an image processing unit 927, a multiplexing/demultiplexing unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 926, the image processing unit 927, the multiplexing/demultiplexing unit 928, the recording/reproducing unit 929, the display unit 930, and the control unit 931.

The mobile telephone 920 performs actions such as transmitting/receiving an audio signal, transmitting/receiving an electronic mail or image data, capturing an image, and recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the data. The audio codec 923 thereafter outputs the compressed audio data to the communication unit 922. The communication unit 922 encodes and modulates the audio data to generate a transmission signal. The communication unit 922 then transmits the generated transmission signal to a base station (not shown) through the antenna 921. Furthermore, the communication unit 922 amplifies a radio signal received through the antenna 921, performs frequency conversion, and acquires a reception signal. The communication unit 922 thereafter demodulates and decodes the reception signal to generate the audio data and output the generated audio data to the audio codec 923. The audio codec 923 expands the audio data, performs D/A conversion on the data, and generates the analog audio signal. The audio codec 923 then supplies the generated audio signal to the speaker 924 to cause it to output the audio.

In the data communication mode, for example, the control unit 931 generates character data configuring an electronic mail, in accordance with a user operation detected through the operation unit 932. The control unit 931 further displays characters on the display unit 930. Moreover, the control unit 931 generates electronic mail data in accordance with an instruction to send it obtained from a user through the operation unit 932 and outputs the generated electronic mail data to the communication unit 922. The communication unit 922 encodes and modulates the electronic mail data to generate a transmission signal. Then, the communication unit 922 transmits the generated transmission signal to the base station (not shown) through the antenna 921. The communication unit 922 further amplifies a radio signal received through the antenna 921, performs frequency conversion, and acquires a reception signal. The communication unit 922 thereafter demodulates and decodes the reception signal, restores the electronic mail data, and outputs the restored electronic mail data to the control unit 931. The control unit 931 displays the content of the electronic mail on the display unit 930 as well as stores the electronic mail data in a storage medium of the recording/reproducing unit 929.

The recording/reproducing unit 929 includes an arbitrary storage medium that is readable and writable. For example, the storage medium may be a built-in storage medium such as a RAM or a flash memory, or may be an externally-mounted storage medium such as a hard disk, a magnetic disk, a magneto-optical disk, an optical disk, a USB memory, or a memory card.

In the photography mode, for example, the camera unit 926 images an object to generate image data and outputs the generated image data to the image processing unit 927. The image processing unit 927 encodes the image data input from the camera unit 926 and stores an encoded stream in the storage medium of the recording/reproducing unit 929.

In the videophone mode, for example, the multiplexing/demultiplexing unit 928 multiplexes a video stream encoded by the image processing unit 927 and an audio stream input from the audio codec 923, and outputs the multiplexed stream to the communication unit 922. The communication unit 922 encodes and modulates the stream to generate a transmission signal. The communication unit 922 then transmits the generated transmission signal to the base station (not shown) through the antenna 921. Moreover, the communication unit 922 amplifies a radio signal received through the antenna 921, performs frequency conversion, and acquires a reception signal. The transmission signal and the reception signal can include an encoded bit stream. The communication unit 922 thus demodulates and decodes the reception signal to restore the stream, and outputs the restored stream to the multiplexing/demultiplexing unit 928. The multiplexing/demultiplexing unit 928 demultiplexes the video stream and the audio stream from the input stream and outputs the video stream and the audio stream to the image processing unit 927 and the audio codec 923, respectively. The image processing unit 927 decodes the video stream to generate video data. The video data is then supplied to the display unit 930, which displays a series of images. The audio codec 923 expands and performs D/A conversion on the audio stream to generate an analog audio signal. The audio codec 923 then supplies the generated audio signal to the speaker 924 to cause it to output the audio.

In the mobile phone 920 configured as described above, the image processing unit 927 has the functions of the image encoding device 10 and the image decoding device 60 according to the aforementioned embodiment. Therefore, the mobile phone 920 can encode a video in real time and reproduce the video from an encoded stream of the encoded video in a form that is more suitable for parallel processing by multiple chips.

(3) Third Application Example

Figure 17:
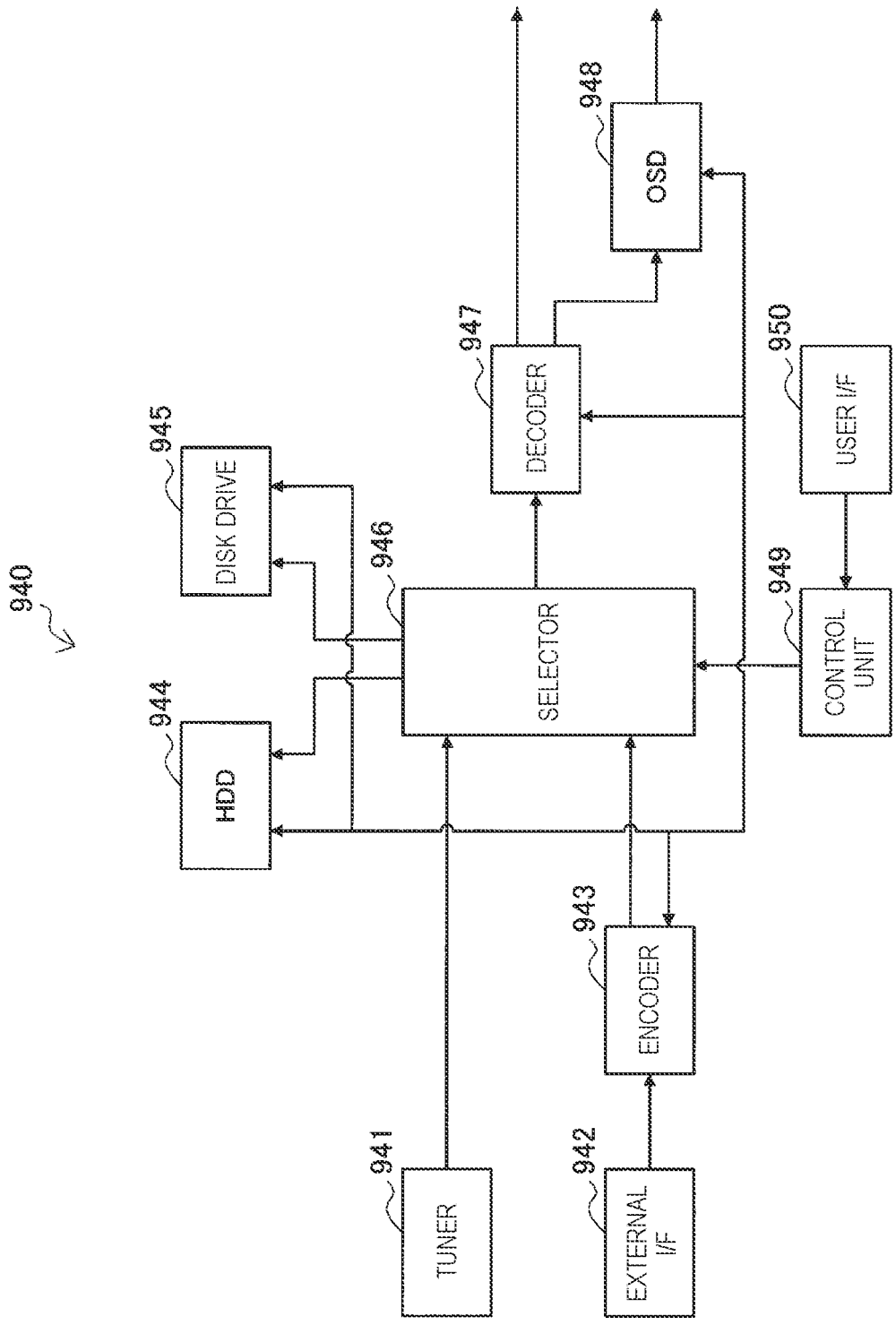
FIG. 17 is a block diagram illustrating an example of a schematic configuration of a recording/reproduction device.

FIG. 17 illustrates an example of a schematic configuration of a recording/reproducing apparatus to which the above-described embodiments are applied. The recording/reproducing apparatus 940 encodes audio data and video data of a received broadcast program and records the data into a recording medium, for example. The recording/reproducing apparatus 940 may also encode audio data and video data acquired from another apparatus and record the data into the recording medium, for example. The recording/reproducing apparatus 940 reproduces the data recorded in the recording medium on a monitor and a speaker, for example, in response to a user instruction. In this case, recording/reproducing apparatus 940 decodes the audio data and the video data.

The recording/reproducing apparatus 940 includes a tuner 941, an external interface 942, an encoder 943, a hard disk drive (HDD) 944, a disk drive 945, a selector 946, a decoder 947, an on-screen display (OSD) 948, a control unit 949, and a user interface 950.

The tuner 941 extracts a signal of a desired channel from a broadcast signal received through an antenna (not shown) and demodulates the extracted signal. The tuner 941 then outputs an encoded bit stream obtained by the demodulation to the selector 946. That is, the tuner 941 has a role as transmission means in the recording/reproducing apparatus 940.

The external interface 942 is an interface which connects the recording/reproducing apparatus 940 with an external device or a network. The external interface 942 may be, for example, an IEEE 1394 interface, a network interface, a USB interface, or a flash memory interface. The video data and the audio data received through the external interface 942 are input to the encoder 943, for example. That is, the external interface 942 has a role as transmission means in the recording/reproducing apparatus 940.

The encoder 943 encodes the video data and the audio data in the case where the video data and the audio data input from the external interface 942 are not encoded. The encoder 943 thereafter outputs an encoded bit stream to the selector 946.

The HDD 944 records, into an internal hard disk, the encoded bit stream in which content data such as video and audio is compressed, various programs, and other data. The HDD 944 reads these data from the hard disk when the video and the audio are reproduced.

The disk drive 945 records and reads data into/from a recording medium attached to the disk drive. The recording medium attached to the disk drive 945 may be, for example, a DVD disk (such as DVD-Video, DVD-RAM, DVD-R, DVD-RW, DVD+R, or DVD+RW) or a Blu-ray (Registered Trademark) disk.

The selector 946 selects the encoded bit stream input from the tuner 941 or the encoder 943 when recording the video and audio, and outputs the selected encoded bit stream to the HDD 944 or the disk drive 945. When reproducing the video and audio, on the other hand, the selector 946 outputs the encoded bit stream input from the HDD 944 or the disk drive 945 to the decoder 947.

The decoder 947 decodes the encoded bit stream to generate the video data and the audio data. The decoder 904 then outputs the generated video data to the OSD 948 and the generated audio data to an external speaker.

The OSD 948 reproduces the video data input from the decoder 947 and displays the video. The OSD 948 may also superpose an image of a GUI such as a menu, buttons, or a cursor onto the displayed video.

The control unit 949 includes a processor such as a CPU and a memory such as a RAM and a ROM. The memory stores a program executed by the CPU as well as program data. The program stored in the memory is read by the CPU at the start-up of the recording/reproducing apparatus 940 and executed, for example. By executing the program, the CPU controls the operation of the recording/reproducing apparatus 940 in accordance with an operation signal that is input from the user interface 950, for example.

The user interface 950 is connected to the control unit 949. The user interface 950 includes a button and a switch for a user to operate the recording/reproducing apparatus 940 as well as a reception part which receives a remote control signal, for example. The user interface 950 detects a user operation through these components to generate an operation signal, and outputs the generated operation signal to the control unit 949.

In the recording/reproduction device 940 configured as described above, the encoder 943 has the functions of the image encoding device 10 according to the aforementioned embodiment. In addition, the decoder 947 has the functions of the image decoding device 60 according to the aforementioned embodiment. Therefore, the recording/reproduction device 940 can encode a video in real time and reproduce the video from an encoded stream of the encoded video, for example, in a form that is more suitable for parallel processing by multiple chips.

(4) Fourth Application Example

Figure 18:
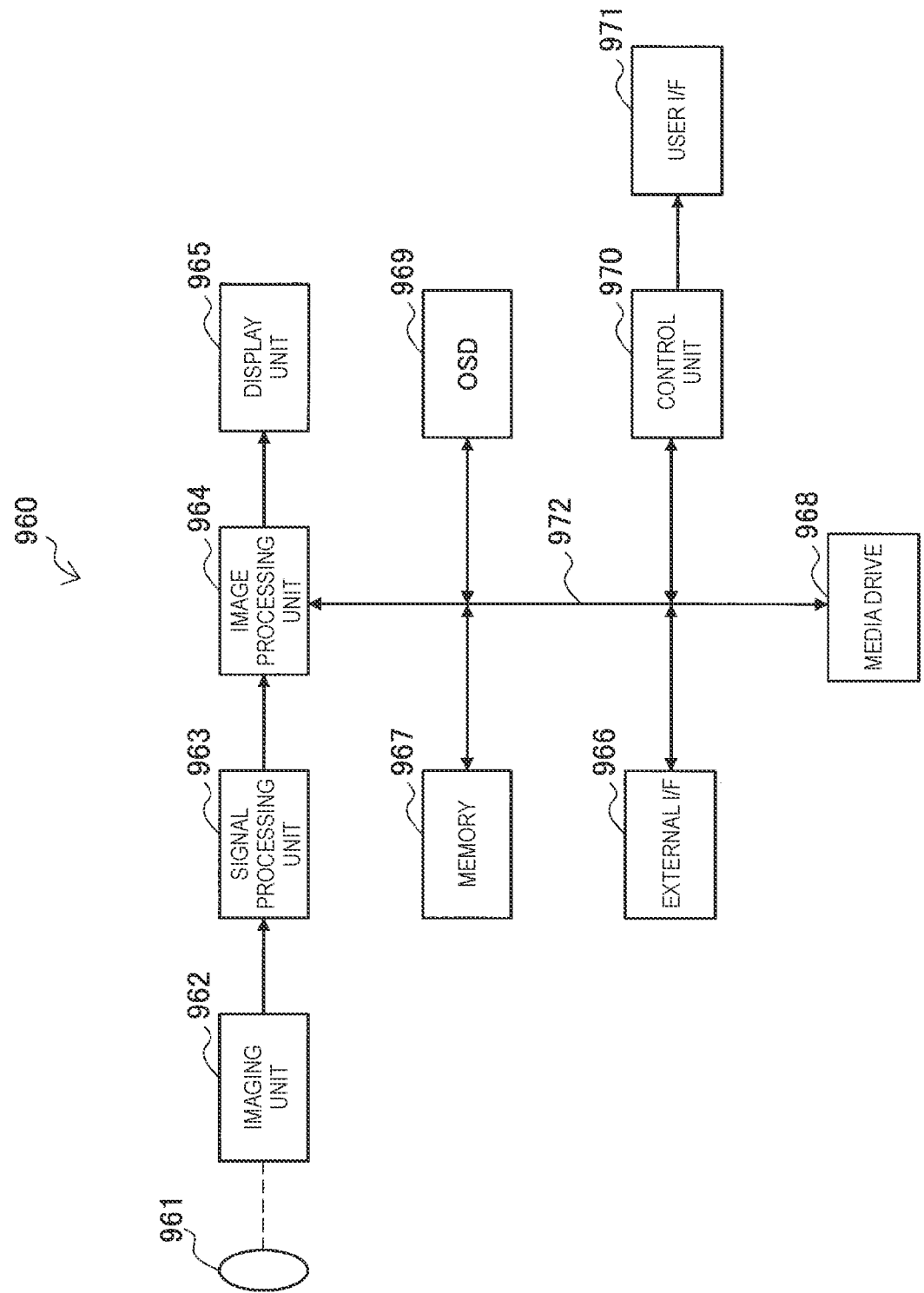
FIG. 18 is a block diagram illustrating an example of a schematic configuration of an imaging apparatus.

FIG. 18 illustrates an example of a schematic configuration of an imaging apparatus to which the above-described embodiments are applied. The imaging apparatus 960 images an object to generate an image, encodes image data, and records the data into a recording medium.

The imaging apparatus 960 includes an optical block 961, an imaging unit 962, a signal processing unit 963, an image processing unit 964, a display unit 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 mutually connects the image processing unit 964, the external interface 966, the memory 967, the media drive 968, the OSD 969, and the control unit 970.

The optical block 961 includes a focus lens and a diaphragm mechanism. The optical block 961 forms an optical image of an object on an imaging plane of the imaging unit 962. The imaging unit 962 includes an image sensor such as a CCD (Charge Coupled Device) or a CMOS (Complementary Metal Oxide Semiconductor) and performs photoelectric conversion to convert the optical image formed on the imaging plane into an image signal as an electric signal. Then, the imaging unit 962 outputs the image signal to the signal processing unit 963.

The signal processing unit 963 performs various camera signal processes such as a knee correction, a gamma correction and a color correction on the image signal input from the imaging unit 962. The signal processing unit 963 outputs the image data, on which the camera signal processes have been performed, to the image processing unit 964.

The image processing unit 964 encodes the image data input from the signal processing unit 963 and generates the encoded data. The image processing unit 964 then outputs the generated encoded data to the external interface 966 or the media drive 968. The image processing unit 964 also decodes the encoded data input from the external interface 966 or the media drive 968 to generate image data. The image processing unit 964 then outputs the generated image data to the display unit 965. Moreover, the image processing unit 964 may output to the display unit 965 the image data input from the signal processing unit 963 to cause the display unit 965 to display the image. Furthermore, the image processing unit 964 may superpose display data acquired from the OSD 969 onto the image that is output on the display unit 965.

The OSD 969 generates an image of a GUI such as a menu, buttons, or a cursor and outputs the generated image to the image processing unit 964.

The external interface 966 is configured as a USB input/output terminal, for example. The external interface 966 connects the imaging apparatus 960 with a printer when printing an image, for example. Moreover, a drive is connected to the external interface 966 as needed. A removable medium such as a magnetic disk or an optical disk is attached to the drive, for example, so that a program read from the removable medium can be installed to the imaging apparatus 960. The external interface 966 may also be configured as a network interface that is connected to a network such as a LAN or the Internet. That is, the external interface 966 has a role as transmission means in the imaging apparatus 960.

The recording medium attached to the media drive 968 may be an arbitrary removable medium that is readable and writable such as a magnetic disk, a magneto-optical disk, an optical disk, or a semiconductor memory. Furthermore, the recording medium may be attached to the media drive 968 in a fixed manner so that a non-transportable storage unit such as a built-in hard disk drive or a solid state drive (SSD) is configured, for example.

The control unit 970 includes a processor such as a CPU and a memory such as a RAM and a ROM. The memory stores a program executed by the CPU as well as program data. The program stored in the memory is read by the CPU at the start-up of the imaging apparatus 960 and then executed. By executing the program, the CPU controls the operation of the imaging apparatus 960 in accordance with an operation signal that is input from the user interface 971, for example.

The user interface 971 is connected to the control unit 970. The user interface 971 includes buttons and switches for a user to operate the imaging apparatus 960, for example. The user interface 971 detects a user operation through these components to generate an operation signal, and outputs the generated operation signal to the control unit 970.

In the imaging apparatus 960 configured as described above, the image processing unit 964 has the functions of the image encoding device 10 and the image decoding device 60 according to the aforementioned embodiment. Therefore, the imaging apparatus 960 can encode a video in real time and reproduce the video from an encoded stream of the encoded video in a form that is more suitable for parallel processing by multiple chips.

7. CONCLUSION

The embodiment of the technique according to the present disclosure has been described in detail with reference to FIGS. 1, 2A, 2B, 2C, 3, 4, 5, 6, 7, 8A, 8B, 9, 10, 11, 12, 13, 14, 15, 16, 17 and 18. According to the aforementioned embodiment, the reference pixels at the fractional pixel positions on the further inner side than the first predetermined distance from the boundary of the partial region set in the image to be encoded is included in the set of reference pixels that is set as the search range of the motion vector, in the image encoding device that supports motion compensation of fractional pixel position. In other words, the reference pixels at the fractional pixel positions on the further outer side than the first predetermined distance from the boundary of the partial region are excluded from the search range of the motion vector. Therefore, it is possible to suppress the amount of the memory resource required for buffer the filter taps in a case in which it is attempted to generate the reference pixels at the fractional pixel positions by using the interpolation filter, for example. Necessity for chips to redundantly buffer pixel values in the vicinity of the boundary or to frequently perform inter-chip communication is avoided in a case in which mutually adjacent partial regions are processed in parallel by separate chips, for example.

According to the aforementioned embodiment, the first predetermined distance is a distance in the filter tap direction of the interpolation filter that is used for generating the reference pixels at the individual fractional pixel positions and depends on the tap length of the interpolation filter. In a case in which the first predetermined distance is equal to a half of the maximum tap length, for example, pixels outside a target region are not used as the filter taps of the interpolation filter for generating the reference pixels at the fractional pixel positions for the motion compensation in the target region assigned to a certain chip. Therefore, it is not necessary to perform inter-chip communication with another chip that processes the adjacent region. In a case in which there is a sufficient memory resource for buffering the reference pixels at several integer pixel positions outside the target region, the several reference pixels outside the region may be included in the set of reference pixels. In this case, additional buffering of the pixel values merely for generating the reference pixels at the fractional pixel positions is avoided by deciding the first predetermined distance on the basis of the outermost integer pixel position to be included in the set of reference pixels and the tap length of the interpolation filter.

In addition, according to the aforementioned embodiment, the reference pixels at the integer pixel positions on the further inner side than the second predetermined distance from the boundary of the partial region set in the image to be encoded is included in the set of reference pixels that is set as the search range of the motion vector. In a case in which the second predetermined distance is equal to zero, necessity for referring to the pixels in the adjacent region assigned to another chip for the motion compensation for the target region assigned to a certain chip, for example, is avoided. In a case in which the second predetermined distance is not zero, and the outermost integer pixel position to be included in the set of reference pixels is outside the target region, it is possible to improve prediction precision as a result of the restriction of the search range of the motion vector being weakened in a situation in which an object stays near the boundary while reference outside the region occurs, for example.

In addition, according to the aforementioned embodiment, the merge candidates, for which the reference pixels that are not included in the set of reference pixels is referred to in a case of an application to a certain prediction block in a target region, from among one or more merge candidates for the certain prediction block can be excluded from the merge candidate list in a case in which the merge encoding is supported. In that manner, occurrence of additional buffering of pixel values and interpolation filter computation merely for the merge mode is avoided.

In addition, according to a certain example, the reference pixel at the fractional pixel positions outside the aforementioned first predetermined distance from the region boundary is excluded from the set of reference pixels regardless of the type of the partial region set in the image to be encoded. In this case, it is not necessary for the individual chips to determine the type of the target region and to branch the processing, implementation of the encoder is simplified, and the implementation cost is reduced.

In addition, according to a certain example, the reference pixels at the fractional pixel positions on the further outer side than the aforementioned first predetermined distance from the region boundary are excluded from the set of reference pixels only in a case in which the type of the target region is a dependent slice. In this case, since the search range of the motion vector is not restricted for the independent slice and the tile, for example, there is a possibility that the prediction precision of the inter-prediction increases as compared with a case in which similar restriction is uniformly imposed.

Note that although the slice and the tile have been exemplified as the partial region (or the target region) in this specification, the technique according to the present disclosure can also be applied to a case in which the inter-prediction is executed for each region that is neither a slice nor a tile.

The above-described embodiment can be realized using any of software, hardware, and a combination of software and hardware. A program that constitutes the software may be stored in, for example, a storage medium (a non-transitory media) provided inside or outside the apparatus in advance. Then, each program is read into, for example, a random access memory (RAM) for its execution and executed by a processor.

Mainly described herein is the example where the encoded parameters are inserted into an encoded stream and transmitted from the encoding side to the decoding side. The way to transmit the encoded parameters, however, are not limited to the above example. For example, the encoded parameters may be transmitted or recorded as separate data associated with the encoded bit stream without being multiplexed to the encoded bit stream. Here, the term "association" means to allow images included in a bit stream to be linked with information corresponding to the images when decoding. Namely, the parameters may be transmitted on a different transmission path than that for images (or a bit stream). The parameters may also be recorded in a different recording medium (or in a different recording area of the same recording medium) than that for images (or a bit stream). Furthermore, the parameters and images (or a bit stream) may be associated with each other by an arbitrary unit such as a plurality of frames, one frame, or a portion within a frame.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An image processing apparatus including:

an inter-prediction section that generates a set of reference pixels of fractional pixel positions from a reference image for motion compensation and searches an image to be encoded for a motion vector by using the set of generated reference pixels; and an encoding section that encodes the image to be encoded on a basis of a result of searching for the motion vector by the inter-prediction section, in which the inter-prediction section includes a reference pixel at a fractional pixel position further inward than a first predetermined distance from a boundary of a partial region corresponding to a slice or a tile, in the set of reference pixels that are used for searching the partial region for a motion vector.

(2)

The image processing apparatus according to (1), in which the first predetermined distance is a distance in a filter tap direction of an interpolation filter that is used for generating the reference pixel at the fractional pixel position, and depends on a tap length of the interpolation filter.

(3)

The image processing apparatus according to (2), in which the first predetermined distance is based on an outermost integer pixel position included in the set of reference pixels and the tap length of the interpolation filter.

(4)

The image processing apparatus according to (3), in which the inter-prediction section includes a reference pixel at an integer pixel position further inward than a second predetermined distance from the boundary of the partial region, in the set of reference pixels that are used for searching f the partial region for a motion vector.

(5)

The image processing apparatus according to any one of (1) to (4), in which the inter-prediction section supports merge encoding, and the inter-prediction section excludes, from a merge candidate list, a merge candidate, out of one or more merge candidates for a certain prediction block in the partial region, according to which a reference pixel not included in the set of reference pixels is referred to in a case in which the merge candidate is applied to the certain prediction block.

(6)

The image processing apparatus according to (4), in which the second predetermined distance is equal to zero, and the first predetermined distance is equal to a half of a maximum tap length of the interpolation filter.

(7)

The image processing apparatus according to (4), in which the second predetermined distance is not zero, and an outermost integer pixel position included in the set of reference pixels is outside the partial region.

(8)

The image processing apparatus according to any one of (1) to (7), in which the inter-prediction section does not include a reference pixel at a fractional pixel position outside the first predetermined distance in the set of reference pixels, regardless of a type of the partial region.

(9)

The image processing apparatus according to any one of (1) to (7), in which the inter-prediction section determines whether or not to include a reference pixel at a fractional pixel position outside the first predetermined distance in the set of reference pixels, depending on whether or not a type of the partial region is a dependent slice.

(10)

The image processing apparatus according to any one of (1) to (9), in which the inter-prediction section does not include a reference pixel at a fractional pixel position outside the first predetermined distance in the set of reference pixels, regardless of whether the boundary is a boundary between the partial region and an adjacent region or at a picture end.

(11)

The image processing apparatus according to any one of (1) to (9), in which the inter-prediction section does not include a reference pixel at a fractional pixel position outside the first predetermined distance in the set of reference pixels, only in a case in which the boundary is a boundary between the partial region and an adjacent region.

(12)

The image processing apparatus according to any one of (1) to (11), in which the image to be encoded is divided into at least two partial regions, and a first partial region and a second partial region that are adjacent to each other are processed in parallel by separate chips.

(13)

An image processing method including:

generating a set of reference pixels of fractional pixel positions from a reference image for motion compensation;

searching an image to be encoded for a motion vector by using the set of generated reference pixels; and encoding the image to be encoded on a basis of a result of searching for the motion vector, in which a reference pixel at a fractional pixel position further inward than a first predetermined distance from a boundary of a partial region corresponding to a slice or a tile is included in the set of reference pixels that are used for searching the partial region for a motion vector.

(14)

A program that causes a computer to function as:

an inter-prediction section that generates a set of reference pixels of fractional pixel positions from a reference image for motion compensation and searches an image to be encoded for a motion vector by using the set of generated reference pixels; and an encoding section that encodes the image to be encoded on a basis of a result of searching for the motion vector by the inter-prediction section, in which the inter-prediction section includes a reference pixel at a fractional pixel position further inward than a first predetermined distance from a boundary of a partial region corresponding to a slice or a tile, in the set of reference pixels that are used for searching the partial region for a motion vector.

REFERENCE SIGNS

10 image encoding device
16 lossless encoding section
40 inter-prediction section

The invention claimed is:

1. An image processing apparatus, comprising:
   circuitry configured to:
      generate, by an interpolation filter, a set of reference pixels, wherein
         the set of reference pixels corresponds to a set of fractional pixel positions in a partial region of a reference image,
         the partial region corresponds to one of a slice or a tile,
         a first reference pixel in the set of reference pixels is at a first fractional pixel position of the set of fractional pixel positions,
         the first fractional pixel position is further inward from a boundary of the partial region than a first distance from the boundary of the partial region,
         the first distance is in a filter tap direction of the interpolation filter, and
         the first distance is based on a tap length of the interpolation filter and an outermost integer pixel position of a second reference pixel in the set of reference pixels;

search a specific image for a motion vector based on the set of reference pixels; and
encode the specific image based on a result of the search for the motion vector.

2. The image processing apparatus according to claim 1, wherein the outermost integer pixel position is further inward to the boundary of the partial region than a second distance from the boundary of the partial region.

3. The image processing apparatus according to claim 1, wherein
the circuitry is further configured to
exclude, from a merge candidate list, a merge candidate for a certain prediction block in the partial region, and
the merge candidate is excluded from the merge candidate list based on a third reference pixel that is different from the set of reference pixels.

4. The image processing apparatus according to claim 2, wherein
the second distance is equal to zero, and
the first distance is equal to a half of a maximum tap length of the interpolation filter.

5. The image processing apparatus according to claim 2, wherein
the second distance is unequal to zero, and
the outermost integer pixel position is outside the partial region.

6. The image processing apparatus according to claim 1, wherein
the circuitry is further configured to exclude a third reference pixel from the set of reference pixels,
the third reference pixel is at a second fractional pixel position of the set of fractional pixel positions,
the second fractional pixel position is outside the first distance, and
the exclusion of the third reference pixel from the set of reference pixels is independent of a type of the partial region.

7. The image processing apparatus according to claim 1, wherein
the circuitry is further configured to include a third reference pixel in the set of reference pixels,
the third reference pixel is at a second fractional pixel position of the set of fractional pixel positions,
the second fractional pixel position is outside the first distance, and
the inclusion of the third reference pixel in the set of reference pixels is based on a type of the partial region that is a dependent slice.

8. The image processing apparatus according to claim 1, wherein
the circuitry is further configured to exclude a third reference pixel from the set of reference pixels,
the third reference pixel is at a second fractional pixel position of the set of fractional pixel positions,
the second fractional pixel position is outside the first distance,
the exclusion of the third reference pixel from the set of reference pixels is independent of the boundary, and
the boundary is one of at a picture end or between the partial region and an adjacent region of the reference image.

9. The image processing apparatus according to claim 1, wherein
the circuitry is further configured to exclude a third reference pixel from the set of reference pixels,
the third reference pixel is at a second fractional pixel position of the set of fractional pixel positions,
the second fractional pixel position is outside the first distance, and
the exclusion of the third reference pixel from the set of reference pixels is based on the boundary that is between the partial region and an adjacent region of the reference image.

10. The image processing apparatus according to claim 1, further comprising:
a first chip; and
a second chip different from the first chip, wherein
the specific image is divided into a first partial region and a second partial region,
the first partial region is adjacent to the second partial region, and
the first chip is configured to process the first partial region,
the second chip is configured to process the second partial region, and
the first partial region is processed in parallel with the second partial region.

11. An image processing method, comprising:
generating, by an interpolation filter, a set of reference pixels, wherein
the set of reference pixels corresponds to a set of fractional pixel positions in a partial region of a reference image,
the partial region corresponds to one of a slice or a tile,
a first reference pixel in the set of reference pixels is at a fractional pixel position of the set of fractional pixel positions,
the fractional pixel position is further inward from a boundary of the partial region than a specific distance from the boundary of the partial region,
the specific distance is in a filter tap direction of the interpolation filter, and
the specific distance is based on a tap length of the interpolation filter and an outermost integer pixel position of a second reference pixel in the set of reference pixels;
searching a specific image for a motion vector based on the set of reference pixels; and
encoding the specific image based on a result of the searching.

12. A non-transitory computer-readable medium having stored thereon, computer-executable instructions which, when executed by a processor of an information processing apparatus, cause the processor to execute operations, the operations comprising:
generating, by an interpolation filter, a set of reference pixels, wherein
the set of reference pixels corresponds to a set of fractional pixel positions in a partial region of a reference image,
the partial region corresponds to one of a slice or a tile,
a first reference pixel in the set of reference pixels is at a fractional pixel position of the set of fractional pixel positions,
the fractional pixel position is further inward from a boundary of the partial region than a specific distance from the boundary of the partial region,
the specific distance is in a filter tap direction of the interpolation filter, and
the specific distance is based on a tap length of the interpolation filter and an outermost integer pixel position of a second reference pixel in the set of reference pixels;

searching a specific image for a motion vector based on the set of reference pixels; and encoding the specific image based on a result of the searching.

\* \* \* \* \*